United States Patent
Zhang et al.

(10) Patent No.: US 12,167,295 B2
(45) Date of Patent: Dec. 10, 2024

(54) COMMUNICATION METHOD, AND DISTANCE DETERMINING METHOD AND APPARATUS

(71) Applicant: Huawei Technologies Co., Ltd., Guangdong (CN)

(72) Inventors: Xingwei Zhang, Lund (SE); Junwei Wang, Shenzhen (CN); Chao Li, Beijing (CN); Haining Huang, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 388 days.

(21) Appl. No.: 17/452,544

(22) Filed: Oct. 27, 2021

(65) Prior Publication Data

US 2022/0053286 A1 Feb. 17, 2022

Related U.S. Application Data

(63) Continuation of application No. PCT/CN2020/084457, filed on Apr. 13, 2020.

(30) Foreign Application Priority Data

Apr. 28, 2019 (CN) .......................... 201910351476.2

(51) Int. Cl.
*H04W 4/23* (2018.01)
*H04B 17/318* (2015.01)
(Continued)

(52) U.S. Cl.
CPC .......... *H04W 4/023* (2013.01); *H04B 17/318* (2015.01); *H04L 1/1607* (2013.01)

(58) Field of Classification Search
CPC ..... H04W 4/023; H04B 17/318; H04L 1/1607
(Continued)

(56) References Cited

U.S. PATENT DOCUMENTS

2019/0044667 A1   2/2019  Guo et al.
2022/0103309 A1*  3/2022  Lee .......................... H04L 1/00

FOREIGN PATENT DOCUMENTS

CN   103167521 A   6/2013
CN   107079407 A   8/2017
(Continued)

OTHER PUBLICATIONS

R1-1904257, Sony, Discussion on HARQ feedback for NR V2X communication, 3GPP TSG RAN WG1 #96bis, Xi an, China, Apr.-Apr. 8-12, 2019, 3 pages.
(Continued)

*Primary Examiner* — Rasha S Al Aubaidi
*Assistant Examiner* — Jirapon Tulop
(74) *Attorney, Agent, or Firm* — WOMBLE BOND DICKINSON (US) LLP

(57) ABSTRACT

This application provides a communication method, and a distance determining method and apparatus. A first terminal device sends a first signal. A second terminal device determines whether a location of the second terminal device is a specified area. When the location of the second terminal device is the specified area, the second terminal device sends feedback information. When the location of the second terminal device is not the specified area, the second terminal device does not send feedback information or sends less feedback information. This method is applicable to communication, for example, V2X communication or D2D communication, between terminal devices on a sidelink.

20 Claims, 4 Drawing Sheets

(51) Int. Cl.
*H04L 1/1607* (2023.01)
*H04W 4/02* (2018.01)

(58) Field of Classification Search
USPC ...................................................... 455/456.1
See application file for complete search history.

(56) References Cited

FOREIGN PATENT DOCUMENTS

| | | |
|---|---|---|
| JP | 2012028944 A | 2/2012 |
| WO | 2019004688 A1 | 1/2019 |

OTHER PUBLICATIONS

R1-1902995, Qualcomm Incorporated, Physical layer procedures for HARQ operation for groupcast and unicast transmissions, 3GPP TSG RAN WG1 Meeting #96, Athens, Greece, Feb. 25-Mar. 1, 2019, total 12 pages.

* cited by examiner

COMMUNICATION METHOD, AND DISTANCE DETERMINING METHOD AND APPARATUS

CROSS-REFERENCE TO RELATED APPLICATIONS

This application is a continuation of International Application No. PCT/CN2020/084457, filed on Apr. 13, 2020, which claims priority to Chinese Patent Application No. 201910351476.2, filed on Apr. 28, 2019. The disclosures of the aforementioned applications are hereby incorporated by reference in their entireties.

TECHNICAL FIELD

This application relates to the wireless communication field, and in particular, to a communication method, and a distance determining method and apparatus.

BACKGROUND

Currently, a feedback mechanism of a sidelink (SL) is introduced in device to device (D2D) communication based on a $5^{th}$ generation (5G) mobile communication technology, for example, vehicle to everything (V2X) communication based on a new radio (NR) technology. For example, a sending terminal device adjusts, based on feedback information, for example, response information of a hybrid automatic repeat request (HARQ) and channel state information (CSI) of the side link, of a receiving terminal device in a circular area with the sending terminal device as a center, a communication policy between the sending terminal device and the receiving terminal device, for example, a resource scheduling policy or a data sending policy.

When a quantity of receiving terminal devices in the circular area with the sending terminal device as the center is relatively large, a large amount of feedback information needs to be transmitted. In addition, to ensure reliability of transmitting the feedback information, different resources of feedback information usually further need to be configured for different receiving terminal devices. However, feedback information of a receiving terminal device whose channel condition is good and/or that is relatively close to the sending terminal device, and feedback information of a receiving terminal device whose channel condition is poor and/or that is relatively far from the sending terminal device have no reference value. In addition, for a plurality of receiving terminal devices whose channel conditions are similar, content of feedback information is similar. Only a part of feedback information is needed to adjust a communication policy. In other words, in this case, most of the feedback information may be considered as redundant information. The feedback information that has no reference value and the redundant feedback information usually occupy a large quantity of resources of feedback information. Consequently, resources that can be used to transmit data become fewer. This adversely affects inter-device communication between the sending terminal device and the receiving terminal device.

SUMMARY

This application provides a communication method, and a distance determining method and apparatus, to reduce an amount of feedback information and a quantity of resources of feedback information occupied by the feedback information, and improve resource utilization and communication efficiency.

To achieve the foregoing objectives, the following technical solutions are used in this application.

According to a first aspect, a communication method is provided. The communication method is applied to a first terminal device. The communication method includes: A first terminal device sends a first signal. Then, the first terminal device receives feedback information from at least one second terminal device in a specified area. The specified area is an area to which a distance from the first terminal device is greater than or equal to a lower distance threshold and/or less than or equal to an upper distance threshold; or the specified area is an area in which strength of a signal received from the first terminal device is greater than or equal to a lower signal strength threshold and/or less than or equal to an upper signal strength threshold.

According to the communication method provided in this application, after sending the first signal, the first terminal device receives only the feedback information sent by the second terminal device in the specified area determined based on the upper distance threshold and the lower distance threshold or the upper signal strength threshold and the lower signal strength threshold, for example, an annular area, and does not receive feedback information sent by a terminal device that communicates with the first terminal device outside the specified area. This can resolve a problem that feedback information sent by a terminal device that is extremely close to the first terminal device has no reference value but occupies a large quantity of resources of feedback information. Therefore, an amount of feedback information and a quantity of resources of feedback information occupied by the feedback information are reduced, and resource utilization and communication efficiency can be improved.

In one embodiment, the upper distance threshold is positively correlated with quality of service, a priority of service, or a quantity of resources of feedback information; and/or the lower distance threshold is negatively correlated with the quality of service, the priority of service, or the quantity of resources of feedback information.

In one embodiment, the feedback information may include a negative acknowledgment (NACK) and/or channel state information (CSI). Correspondingly, the upper distance threshold is negatively correlated with a quantity of negative acknowledgments NACKs, an amount of channel state information CSI less than or equal to a first threshold, or a quantity of timeslots in which negative acknowledgments NACKs are received within a first specified time period; and/or the lower distance threshold is positively correlated with the quantity of negative acknowledgments NACKs, the amount of channel state information CSI less than or equal to the first threshold, or the quantity of timeslots in which the negative acknowledgments NACKs are received within the first specified time period.

In one embodiment, the feedback information may include an acknowledgment (ACK) and/or channel state information (CSI). Correspondingly, the upper distance threshold is positively correlated with a quantity of acknowledgments ACKs or an amount of CSI information greater than or equal to a second threshold; and/or the lower distance threshold is positively correlated with the quantity of acknowledgments ACKs or the amount of CSI information greater than or equal to the second threshold.

In one embodiment, the upper signal strength threshold is positively correlated with quality of service, a priority of service, or a quantity of resources of feedback information;

and/or the lower signal strength threshold is negatively correlated with the quality of service, the priority of service, or the quantity of resources of feedback information.

In one embodiment, the feedback information may include a negative acknowledgment NACK and/or channel state information CSI. Correspondingly, the upper signal strength threshold is negatively correlated with a quantity of negative acknowledgments NACKs, an amount of channel state information CSI less than or equal to a first threshold, or a quantity of timeslots in which negative acknowledgments NACKs are received within a first specified time period; and/or the lower signal strength threshold is positively correlated with the quantity of negative acknowledgments NACKs, the amount of channel state information CSI less than or equal to the first threshold, or the quantity of timeslots in which the negative acknowledgments NACKs are received within the first specified time period. The first specified time period may be a plurality of timeslots, one or more radio frames, or a specified time period, for example, 50 ms or 100 ms.

Further, when the first specified time period is one timeslot, the quantity of negative acknowledgments NACKs may be the quantity of timeslots in which the negative acknowledgments NACKs are received by the first terminal device within the first specified time period. Alternatively, when the first specified time period is the plurality of timeslots, the quantity of negative acknowledgments NACKs may be the quantity of timeslots in which the negative acknowledgments NACKs are received by the first terminal device within the first specified time period. The plurality of timeslots may be a plurality of consecutive timeslots, or a time window including a plurality of consecutive timeslots, for example, 10 ms or 50 ms. This is not limited in this embodiment of this application.

In one embodiment, the feedback information may include an acknowledgment ACK and/or channel state information CSI. Correspondingly, the upper signal strength threshold is negatively correlated with a quantity of acknowledgments ACKs or an amount of CSI information greater than or equal to a second threshold; and/or the lower signal strength threshold is negatively correlated with the quantity of acknowledgments ACKs or the amount of CSI information greater than or equal to the second threshold.

In one embodiment, there may be a plurality of specified areas; and a feedback policy of any one of the plurality of specified areas may be independently determined, and/or a resource of feedback information of the any one of the plurality of specified areas may be independently determined. The feedback policy may include: sending a negative acknowledgment NACK and skipping sending an acknowledgment ACK indication; or sending an acknowledgment ACK or sending a negative acknowledgment NACK indication; or skipping sending an acknowledgment ACK and skipping sending a negative acknowledgment NACK indication; or sending channel state information CSI less than the first threshold and skipping sending channel state information CSI greater than or equal to the first threshold; or sending channel state information CSI; or skipping sending channel state information CSI.

In one embodiment, the communication method according to the first aspect may further include: The first terminal device sends one or more of an upper distance threshold, a lower distance threshold, an upper signal strength threshold, and a lower signal strength threshold of the specified area. The first terminal device may send the one or more of the upper distance threshold, the lower distance threshold, the upper signal strength threshold, and the lower signal strength threshold by using radio resource control signaling, media access control signaling, a master information block, a system information block, or physical control information.

In one embodiment, the communication method according to the first aspect may further include: The first terminal device adjusts a data sending policy based on the feedback information.

In one embodiment, that the first terminal device adjusts a data sending policy based on the feedback information may include: If the feedback information includes the negative acknowledgment NACK, the first terminal device resends data. Alternatively, if the first terminal device does not receive any feedback information within a second specified time period, the first terminal device resends data.

According to a second aspect, a communication method is provided. The communication method is applied to a second terminal device. The communication method includes: The second terminal device receives a first signal from a first terminal device. Then, the second terminal device determines that the second terminal device is located in a specified area. The specified area is an area to which a distance from the first terminal device is greater than or equal to a lower distance threshold and/or less than or equal to an upper distance threshold; or the specified area is an area in which strength of a signal received from the first terminal device is greater than or equal to a lower signal strength threshold and/or less than or equal to an upper signal strength threshold. Then, the second terminal device sends feedback information to the first terminal device.

According to the communication method provided in this application, after receiving the first signal from the first terminal device, the second terminal device determines that whether the second terminal device is located in the specified area based on the upper distance threshold and the lower distance threshold or the upper signal strength threshold and the lower signal strength threshold, for example, an annular area. If the second terminal device determines that the second terminal device is located in the specified area, the second terminal device sends the feedback information. This can resolve a problem that feedback information sent by a terminal device that is extremely close to the first terminal device has no reference value but occupies a large quantity of resources of feedback information. Therefore, an amount of feedback information and a quantity of resources of feedback information occupied by the feedback information are reduced, and resource utilization and communication efficiency can be improved.

In one embodiment, the upper distance threshold is positively correlated with quality of service, a priority of service, or a quantity of resources of feedback information; and/or the lower distance threshold is negatively correlated with the quality of service, the priority of service, or the quantity of resources of feedback information.

In one embodiment, the upper signal strength threshold is positively correlated with quality of service, a priority of service, or a quantity of resources of feedback information; and/or the lower signal strength threshold is negatively correlated with the quality of service, the priority of service, or the quantity of resources of feedback information.

In one embodiment, there may be a plurality of specified areas; and a feedback policy of any one of the plurality of specified areas may be independently determined, and/or a resource of feedback information of the any one of the plurality of specified areas may be independently determined. The feedback policy may include: sending a negative acknowledgment NACK and skipping sending an acknowledgment ACK indication; or sending an acknowledgment ACK or sending a negative acknowledgment NACK indication; or skipping sending an acknowledgment ACK and skipping sending a negative acknowledgment NACK indication; or sending channel state information CSI less than the first threshold and skipping sending channel state information CSI greater than or equal to the first threshold; or sending channel state information CSI; or skipping sending channel state information CSI.

In one embodiment, the communication method according to the second aspect may further include: The second terminal device receives one or more of an upper distance threshold, a lower distance threshold, an upper signal strength threshold, and a lower signal strength threshold of the specified area from the first terminal device or a base station.

According to a third aspect, a distance determining method is provided. The distance determining method is applied to a first terminal device. The distance determining method includes: The first terminal device sends location information of the first terminal device. The location information of the first terminal device may be location information determined based on information provided by a global navigation satellite system (GNSS). The location information may be absolute coordinates of a location in which the first terminal device is located, for example, longitude and latitude coordinates. The location information may alternatively be an identifier of a preset area in which the first terminal device is located and a position offset (which may also be referred to as relative coordinates) of the first terminal device relative to a reference point in the preset area.

In one embodiment, the distance determining method according to the third aspect may further include: The first terminal device enables radio resource control signaling, media access control signaling, a master information block, a system information block, or physical control information to carry longitude and/or latitude information of the first terminal device.

In one embodiment, the distance determining method according to the third aspect may further include: The first terminal device enables the radio resource control signaling, the media access control signaling, the master information block, the system information block, or the physical control information to carry an index of an area in which the first terminal device is located.

In one embodiment, the distance determining method according to the third aspect may further include: The first terminal device enables the radio resource control signaling, the media access control signaling, the master information block, the system information block, or the physical control information to carry a longitude offset and/or a latitude offset of the first terminal device in a preset area.

According to a fourth aspect, a distance determining method is provided. The distance determining method is applied to a second terminal device. The distance determining method includes: The second terminal device receives location information of a first terminal device and determines location information of the second terminal device. Then, the second terminal device determines a distance between the second terminal device and the first terminal device based on the location information of the first terminal device and the location information of the second terminal device. For the location information of the second terminal device, refer to the location information of the first terminal device and the determining method in the third aspect. Details are not described herein again.

In one embodiment, the distance determining method according to the fourth aspect may further include: The second terminal device receives longitude and/or latitude information of the first terminal device that are/is carried by radio resource control signaling, media access control signaling, a master information block, a system information block, or physical control information and that is sent by the first terminal device.

In one embodiment, the distance determining method according to the fourth aspect may further include: The second terminal device receives an index of an area in which the first terminal device is located that is carried by the radio resource control signaling, the media access control signaling, the master information block, the system information block, or the physical control information and that is sent by the first terminal device.

In one embodiment, the distance determining method according to the fourth aspect may further include: The second terminal device receives a longitude offset and/or a latitude offset of the first terminal device in a preset area that are/is carried by the radio resource control signaling, the media access control signaling, the master information block, the system information block, or the physical control information and that is sent by the first terminal device.

It is easy to understand that the second terminal device may also send the location information of the second terminal device, so that another terminal device determines a distance between the another terminal device and the second terminal device based on the location information of the second terminal device.

According to a fifth aspect, a communication apparatus is provided. The communication apparatus is used in a first terminal device. The communication apparatus includes a sending module and a receiving module. The sending module is configured to send a first signal. The receiving module is configured to receive feedback information from at least one second terminal device in a specified area. The specified area is an area to which a distance from the first terminal device is greater than or equal to a lower distance threshold and/or less than or equal to an upper distance threshold; or the specified area is an area in which strength of a signal received from the first terminal device is greater than or equal to a lower signal strength threshold and/or less than or equal to an upper signal strength threshold.

In one embodiment, the upper distance threshold is positively correlated with quality of service, a priority of service, or a quantity of resources of feedback information; and/or the lower distance threshold is negatively correlated with the quality of service, the priority of service, or the quantity of resources of feedback information.

In one embodiment, the feedback information may include a negative acknowledgment NACK and/or channel state information CSI. Correspondingly, the upper distance threshold is negatively correlated with a quantity of negative acknowledgments NACKs, an amount of channel state information CSI less than or equal to a first threshold, or a quantity of timeslots in which negative acknowledgments NACKs are received within a first specified time period; and/or the lower distance threshold is positively correlated with the quantity of negative acknowledgments NACKs, the amount of channel state information CSI less than or equal to the first threshold, or the quantity of timeslots in which the negative acknowledgments NACKs are received within the first specified time period.

In one embodiment, the feedback information may include an acknowledgment ACK and/or channel state information CSI. Correspondingly, the upper distance threshold is positively correlated with a quantity of acknowledgments ACKs or an amount of CSI information greater than or equal to a second threshold; and/or the lower distance threshold is positively correlated with the quantity of acknowledgments ACKs or the amount of CSI information greater than or equal to the second threshold.

In one embodiment, the upper signal strength threshold is positively correlated with quality of service, a priority of service, or a quantity of resources of feedback information; and/or the lower signal strength threshold is negatively correlated with the quality of service, the priority of service, or the quantity of resources of feedback information.

In one embodiment, the feedback information may include a negative acknowledgment NACK and/or channel state information CSI. Correspondingly, the upper signal strength threshold is negatively correlated with a quantity of negative acknowledgments NACKs, an amount of channel state information CSI less than or equal to a first threshold, or a quantity of timeslots in which negative acknowledgments NACKs are received within a first specified time period; and/or the lower signal strength threshold is positively correlated with the quantity of negative acknowledgments NACKs, the amount of channel state information CSI less than or equal to the first threshold, or the quantity of timeslots in which the negative acknowledgments NACKs are received within the first specified time period.

Further, when the first specified time period is one timeslot, the quantity of negative acknowledgments NACKs may be the quantity of timeslots in which the negative acknowledgments NACKs are received by the first terminal device within the first specified time period. Alternatively, when the first specified time period is a plurality of timeslots, the quantity of negative acknowledgments NACKs may be the quantity of timeslots in which the negative acknowledgments NACKs are received by the first terminal device within the first specified time period. The plurality of timeslots may be a plurality of consecutive timeslots, or a time window (time window) including a plurality of consecutive timeslots, for example, 10 ms or 50 ms. This is not limited in this embodiment of this application.

In one embodiment, the feedback information may include an acknowledgment ACK and/or channel state information CSI. Correspondingly, the upper signal strength threshold is negatively correlated with a quantity of acknowledgments ACKs or an amount of CSI information greater than or equal to a second threshold; and/or the lower signal strength threshold is negatively correlated with the quantity of acknowledgments ACKs or the amount of CSI information greater than or equal to the second threshold.

In one embodiment, there may be a plurality of specified areas; and a feedback policy of any one of the plurality of specified areas may be independently determined, and/or a resource of feedback information of the any one of the plurality of specified areas may be independently determined. The feedback policy may include: sending a negative acknowledgment NACK and skipping sending an acknowledgment ACK indication; or sending an acknowledgment ACK or sending a negative acknowledgment NACK indication; or skipping sending an acknowledgment ACK and skipping sending a negative acknowledgment NACK indication; or sending channel state information CSI less than the first threshold and skipping sending channel state information CSI greater than or equal to the first threshold; or sending channel state information CSI; or skipping sending channel state information CSI.

In one embodiment, the sending module is further configured to send one or more of an upper distance threshold, a lower distance threshold, an upper signal strength threshold, and a lower signal strength threshold of the specified area.

In one embodiment, the communication apparatus according to the fifth aspect may further include a processing module. The processing module is configured to adjust a data sending policy based on the feedback information.

In one embodiment, the processing module is further configured to: if the feedback information includes the negative acknowledgment NACK, control the sending module to resend data. Alternatively, In one embodiment, the processing module is further configured to: if the receiving module does not receive any feedback information within a second specified time period, control the sending module to resend data.

It should be noted that the communication apparatus according to the fifth aspect may be a terminal device, or may be a chip or a chip system disposed in a terminal device. This is not limited in this application.

In addition, the communication apparatus according to the fifth aspect may further include another module, for example, a storage module. This is not limited in this application.

According to a sixth aspect, a communication apparatus is provided. The communication apparatus is used in a second terminal device. The communication apparatus includes a receiving module, a sending module, and a processing module. The receiving module is configured to receive a first signal from a first terminal device. The processing module is configured to determine that the communication apparatus is located in a specified area. The specified area is an area to which a distance from the first terminal device is greater than or equal to a lower distance threshold and/or less than or equal to an upper distance threshold; or the specified area is an area in which strength of a signal received from the first terminal device is greater than or equal to a lower signal strength threshold and/or less than or equal to an upper signal strength threshold. The sending module is configured to send feedback information to the first terminal device.

In one embodiment, the upper distance threshold is positively correlated with quality of service, a priority of service, or a quantity of resources of feedback information; and/or the lower distance threshold is negatively correlated with the quality of service, the priority of service, or the quantity of resources of feedback information.

In one embodiment, the upper signal strength threshold is positively correlated with quality of service, a priority of service, or a quantity of resources of feedback information; and/or the lower signal strength threshold is negatively correlated with the quality of service, the priority of service, or the quantity of resources of feedback information.

In one embodiment, there may be a plurality of specified areas; and a feedback policy of any one of the plurality of specified areas may be independently determined, and/or a resource of feedback information of the any one of the plurality of specified areas may be independently determined. The feedback policy may include: sending a negative acknowledgment NACK and skipping sending an acknowledgment ACK indication; or sending an acknowledgment ACK or sending a negative acknowledgment NACK indication; or skipping sending an acknowledgment ACK and skipping sending a negative acknowledgment NACK indication; or sending channel state information CSI less than the first threshold and skipping sending channel state information CSI greater than or equal to the first threshold; or sending channel state information CSI; or skipping sending channel state information CSI.

In one embodiment, the receiving module is further configured to receive one or more of an upper distance threshold, a lower distance threshold, an upper signal strength threshold, and a lower signal strength threshold of the specified area from the first terminal device or a base station.

The communication apparatus according to the sixth aspect may be a terminal device, or may be a chip or a chip system disposed in a terminal device. This is not limited in this application.

In addition, the communication apparatus according to the sixth aspect may further include another module, for example, a storage module. This is not limited in this application.

According to a seventh aspect, a communication apparatus is provided. The communication apparatus is used in a first terminal device. The communication apparatus includes a sending module and a processing module. The sending module is configured to send location information of the communication apparatus. The location information of the communication apparatus may be location information determined by the processing module based on information provided by a GNSS. The location information may be absolute coordinates of a location in which the communication apparatus is located, for example, longitude and latitude coordinates. The location information may alternatively be an identifier of a preset area in which the communication apparatus is located and a position offset (which may also be referred to as relative coordinates) of the communication apparatus relative to a reference point in the preset area.

In one embodiment, the sending module is further configured to enable radio resource control signaling, media access control signaling, a master information block, a system information block, or physical control information to carry longitude and/or latitude information of the communication apparatus.

In one embodiment, the sending module is further configured to enable the radio resource control signaling, the media access control signaling, the master information block, the system information block, or the physical control information to carry an index of an area in which the communication apparatus is located.

In one embodiment, the sending module is further configured to enable the radio resource control signaling, the media access control signaling, the master information block, the system information block, or the physical control information to carry a longitude offset and/or a latitude offset of the communication apparatus.

In one embodiment, the communication apparatus according to the seventh aspect may further include a receiving module. The receiving module is configured to receive location information of another terminal device, so that the communication apparatus determines a distance between the communication apparatus and the another terminal device based on the location information of the another terminal device.

The communication apparatus according to the seventh aspect may be a terminal device, or may be a chip or a chip system disposed in a terminal device. This is not limited in this application.

In addition, the communication apparatus according to the seventh aspect may further include another module, for example, a storage module. This is not limited in this application.

According to an eighth aspect, a communication apparatus is provided. The communication apparatus is used in a second terminal device. The communication apparatus includes a receiving module and a processing module. The receiving module is configured to receive location information of the first terminal device. The processing module is configured to determine location information of the communication apparatus. The processing module is further configured to determine a distance between the communication apparatus and the first terminal device based on the location information of the first terminal device and the location information of the communication apparatus. For the location information of the communication apparatus, refer to the location information of the first terminal device and the determining method in the third aspect. Details are not described herein again.

In one embodiment, the receiving module is further configured to receive longitude and/or latitude information of the first terminal device that are/is carried by radio resource control signaling, media access control signaling, a master information block, a system information block, or physical control information and that is sent by the first terminal device.

In one embodiment, the receiving module is further configured to receive an index of an area in which the first terminal device is located that is carried by the radio resource control signaling, the media access control signaling, the master information block, the system information block, or the physical control information and that is sent by the first terminal device.

In one embodiment, the receiving module is further configured to receive a longitude offset and/or a latitude offset of the first terminal device in a preset area that are/is carried by the radio resource control signaling, the media access control signaling, the master information block, the system information block, or the physical control information and that is sent by the first terminal device.

In one embodiment, the communication apparatus may further include a sending module. The sending module is configured to send the location information of the communication apparatus, so that another terminal device determines a distance between the another terminal device and the communication apparatus based on the location information of the communication apparatus.

The communication apparatus according to the eighth aspect may be a terminal device, or may be a chip or a chip system disposed in a terminal device. This is not limited in this application.

In addition, the communication apparatus according to the eighth aspect may further include another module, for example, a storage module. This is not limited in this application.

According to a ninth aspect, a communication apparatus is provided. The communication apparatus includes a processor, and the processor is coupled to a memory. The memory is configured to store a computer program. The processor is configured to execute the computer program stored in the memory, so that the communication apparatus performs the communication method according to any one of the possible implementations of the first aspect and the second aspect, or performs the distance determining method according to any one of the possible implementations of the third aspect and the fourth aspect.

It should be noted that the communication apparatus according to the ninth aspect may be the first terminal device, or may be a chip or a chip system disposed in the first terminal device.

According to a tenth aspect, a computer program product is provided, where the computer program product includes computer program code; and when the computer program code is run on a computer, the computer is enabled to perform the communication method according to any one of the possible implementations of the first aspect and the second aspect, or perform the distance determining method according to any one of the possible implementations of the third aspect and the fourth aspect.

According to an eleventh aspect, a readable storage medium is provided, where the readable storage medium stores a program or instructions; and when the program or the instructions is/are run on a computer, the computer is enabled to perform the communication method according to any one of the possible implementations of the first aspect and the second aspect, or perform the distance determining method according to any one of the possible implementations of the third aspect and the fourth aspect.

DESCRIPTION OF EMBODIMENTS

The following describes in detail a communication method, and a distance determining method and apparatus provided in embodiments of this application with reference to accompanying drawings.

Technical solutions in the embodiments of this application may be applied to various communication systems such as a D2D communication system, a V2X communication system, a machine type communication (MTC) system, a machine-to-machine (M2M) communication system, or an Internet of Vehicles communication system.

All aspects, embodiments, or features are presented in this application by describing a system that may include a plurality of devices, components, modules, and the like. It should be appreciated and understood that each system may include another device, component, module, and the like, and/or may not include all devices, components, modules, and the like discussed with reference to the accompanying drawings. In addition, a combination of these solutions may be used.

In addition, in the embodiments of this application, the terms such as "for example" and "such as" are used to represent giving an example, an illustration, or description. Any embodiment or design scheme described as an "example" in this application should not be explained as being more preferred or having more advantages than another embodiment or design scheme. Exactly, the term "example" is used to present a concept in a specific manner.

In the embodiments of this application, the terms "information", "signal", "message", "channel", and "signaling" may sometimes be interchangeably used. It should be noted that meanings expressed by the terms are consistent when differences between the terms are not emphasized. "Of (of)", "relevant", and "corresponding" may be interchangeably used sometimes. It should be noted that meanings expressed by the terms are consistent when differences between the terms are not emphasized.

In the embodiments of this application, sometimes a subscript, for example, $W_1$, may be written in an incorrect form, for example, W1. Expressed meanings are consistent when differences are not emphasized.

A network architecture and a service scenario described in the embodiments of this application are intended to describe the technical solutions of the embodiments of this application more clearly, and do not constitute a limitation on the technical solutions provided in the embodiments of this application. A person of ordinary skill in the art may know that with evolution of the network architecture and emergence of a new service scenario, the technical solutions provided in the embodiments of this application are also applicable to a similar technical problem.

Figure 1:
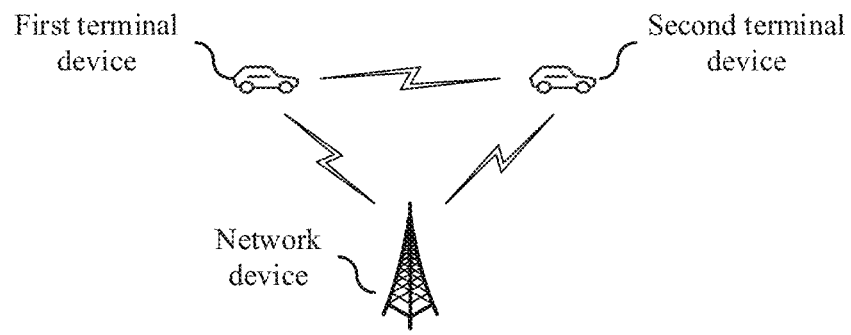
FIG. 1 is a schematic diagram of a communication system according to an embodiment of this application.

Some scenarios in the embodiments of this application are described by using a scenario in a communication system shown in FIG. 1 as an example. It should be noted that the solutions in the embodiments of this application may also be applied to another mobile communication system, and a corresponding name may also be replaced with a name of a corresponding function in the another mobile communication system.

For ease of understanding the embodiments of this application, the communication system shown in FIG. 1 is used as an example to describe in detail a communication system applicable to the embodiments of this application.

As shown in FIG. 1, the communication system includes a plurality of terminal devices, or in one embodiment, one or more network devices.

The terminal device may be a vehicle-mounted terminal device, for example, a first terminal device and a second terminal device, may be a road side unit (RSU) having a function of the terminal device, or may be a terminal device used by a passenger or a pedestrian, for example, a mobile phone or a pad. The network device may be a base station, for example, an evolved NodeB (eNB) in a long term evolution (LTE) system, and a g NodeB (gNB) in a new radio (NR) system. The network device may alternatively be an RSU having a base station function. A type of the terminal device and a type of the network device are not limited in this embodiment of this application.

All the foregoing devices may communicate with each other. During communication, a spectrum of a cellular link may be used, or an intelligent transportation spectrum near 5.9 gigahertz (GHz) may be used. Mutual communication between the foregoing devices may be performed based on an LTE technology or an NR technology, or may be performed based on a device-to-device (D2D) communication technology, for example, a V2X technology. For example, the terminal devices may directly communicate with each other on a sidelink (SL), or may indirectly communicate with each other by using the network device. For another example, the terminal devices may further communicate with the network device on an uplink/downlink (UL&DL).

It should be noted that the foregoing network device is optional. For example, if there is a base station, the scenario is a scenario in which network coverage is available. If there is no base station, the scenario is a scenario in which the network coverage is unavailable. When the network coverage is available, direct communication between the plurality of terminal devices on the sidelink may be performed based on a resource dynamically configured by the network device by using downlink signaling. When the network coverage is unavailable, direct communication between the plurality of terminal devices on the sidelink may be performed based on a preconfigured resource pool.

In this embodiment of this application, the network device is a device that is located on a network side of the communication system and has a wireless transceiver function, or a chip or a chip system that may be disposed in the device. The network device includes but is not limited to an evolved NodeB (eNB), a radio network controller (radio network controller, RNC), a NodeB (NB), a base station controller (BSC), a base transceiver station (BTS), a home base station (for example, a home evolved NodeB, or a home NodeB, HNB), a baseband unit (baseband unit, BBU), an access point (AP) in a wireless fidelity (Wi-Fi) system, a wireless relay node, a wireless backhaul node, a transmission point (transmission and reception point (TRP), or transmission point (TP)), or the like. Alternatively, the network device may be a gNB or a transmission point (TRP or TP) in a 5G system, for example, a new radio (NR) system; may be one antenna panel or a group of antenna panels (including a plurality of antenna panels) of a base station in a 5G system; or may be a network node that constitutes a gNB or a transmission point, for example, a baseband unit (BBU) or a distributed unit (DU).

The terminal device is a terminal device that accesses the communication system and has the wireless transceiver function, or a chip or a chip system that may be disposed in the terminal device. The terminal device may also be referred to as a vehicle-mounted terminal device, a user apparatus, an access terminal device, a user unit, a user station, a mobile station, a remote station, a remote terminal device, a mobile device, a user terminal device, a terminal device, a wireless communication device, a user agent, or a user apparatus. The terminal device in this embodiment of application may be a mobile phone, a tablet computer (Pad), a computer with the wireless transceiver function, a virtual reality (VR) terminal device, an augmented reality (AR) terminal device, a wireless terminal device in industrial control, a wireless terminal device in self driving, a wireless terminal device in remote medical, a wireless terminal device in a smart grid, a wireless terminal device in transportation safety, a wireless terminal device in a smart city, a wireless terminal device in a smart home, or the like.

It should be understood that FIG. 1 is merely a simplified schematic diagram of an example for ease of understanding. The communication system may further include another network device and/or another terminal device that are/is not shown in FIG. 1.

Figure 2:
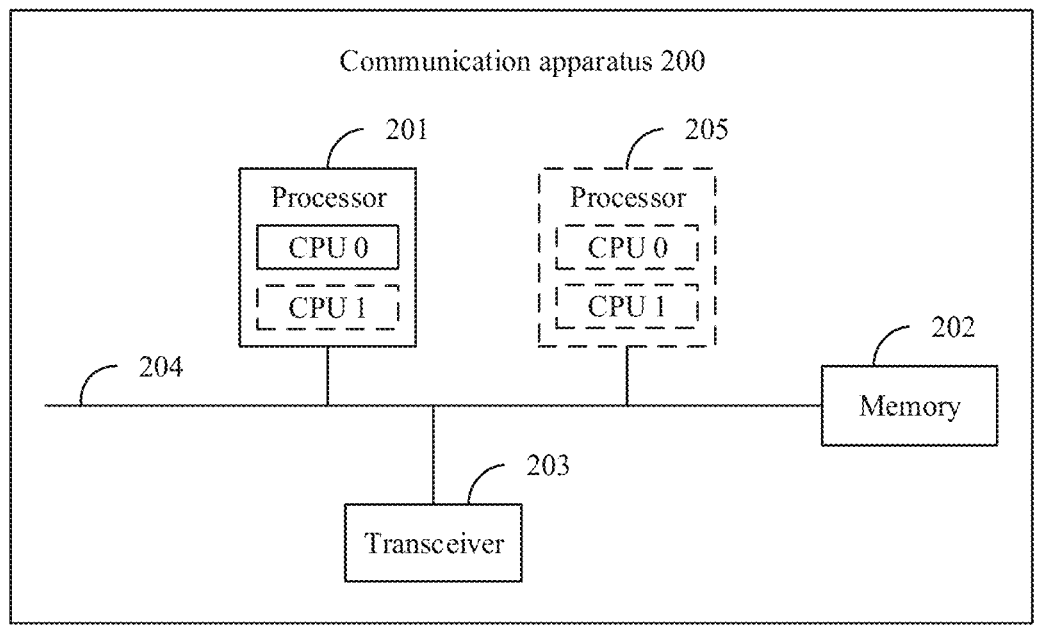
FIG. 2 is a schematic diagram 1 of a structure of a communication apparatus according to an embodiment of this application.

The communication method provided in the embodiments of this application may be applied to a communication apparatus shown in FIG. 2. The communication apparatus may be a terminal device, or may be a chip, a chip system, or another component that has a function of a terminal device applied to the terminal device. As shown in FIG. 2, the communication apparatus 200 may include at least one processor 201, a memory 202, and a transceiver 203.

The following specifically describes each component of the communication apparatus with reference to FIG. 2.

The processor 201 is a control center of the communication apparatus, and may be one processor or may be a collective term of a plurality of processing elements. For example, the processor 201 may be a central processing unit (CPU), or an application-specific integrated circuit (ASIC), or one or more integrated circuits configured to implement this embodiment of this application, for example, one or more microprocessors (DSP) or one or more field-programmable gate arrays (FPGA).

The processor 201 may run or execute a software program stored in the memory 202 and invoke data stored in the memory 202, to execute various functions of the communication apparatus.

During specific implementation, in an embodiment, the processor 201 may include one or more CPUs, for example, a CPU 0 and a CPU 1 shown in FIG. 2.

During specific implementation, in an embodiment, the communication apparatus may include a plurality of processors, for example, the processor 201 and a processor 205 shown in FIG. 2. Each of the processors may be a single-core processor (single-CPU) or may be a multi-core processor (multi-CPU). The processor herein may be one or more communication devices, circuits, and/or processing cores configured to process data (for example, computer program instructions).

The memory 202 may be a read-only memory (ROM) or another type of static storage communication device that can store static information and instructions; or a random access memory (RAM) or another type of dynamic storage communication device that can store information and instructions. The memory 202 may alternatively be an electrically erasable programmable read-only memory (EEPROM), a compact disc read-only memory (CD-ROM) or another compact disc storage, optical disc storage (including a compact disc, a laser disc, an optical disc, a digital versatile disc, a Blu-ray disc, or the like), a magnetic disk storage medium or another magnetic storage communication device, or any other medium that can be used to carry or store expected program code in a form of instructions or a data structure and that is accessible by a computer, but is not limited thereto. The memory 202 may exist independently, or may be integrated with the processor 201.

The memory 202 is configured to store a software program for performing solutions of this application, and the processor 201 controls execution of the software program.

The transceiver 203 is configured to communicate with another communication apparatus. Certainly, the transceiver 203 may be further configured to communicate with a communication network, for example, the Ethernet, a radio access network (RAN), or a wireless local area network (WLAN). The transceiver 203 may include a receiving unit for implementing a receiving function and a sending unit for implementing a sending function.

In this embodiment of this application, the memory 202 may store the software program or instructions. After the communication apparatus 200 is powered on, the processor 201 may read and execute the software program or the instructions stored in the memory 202, so that the communication apparatus 200 may perform the following communication method shown in FIG. 3. For a specific implementation, refer to the following method embodiments. Details are not described herein again.

The structure of the communication apparatus shown in FIG. 2 should not be considered as a limitation on the communication apparatus, in other words, the communication apparatus may include more or fewer components than those shown in the figure, or combine some components, or have different component arrangements.

The communication apparatus 200 may also be sometimes referred to as a terminal device apparatus, a terminal device, or a communication device, and may be a general-purpose device or a special-purpose device. For example, the communication apparatus 200 may be a vehicle-mounted terminal device, an RSU, a palmtop computer (for example, personal digital assistant, PDA), a mobile phone, a tablet computer, a wireless terminal device, an embedded device, or a device having a structure similar to that shown in FIG. 2. A type of the communication apparatus 200 is not limited in this embodiment of this application.

Figure 3:
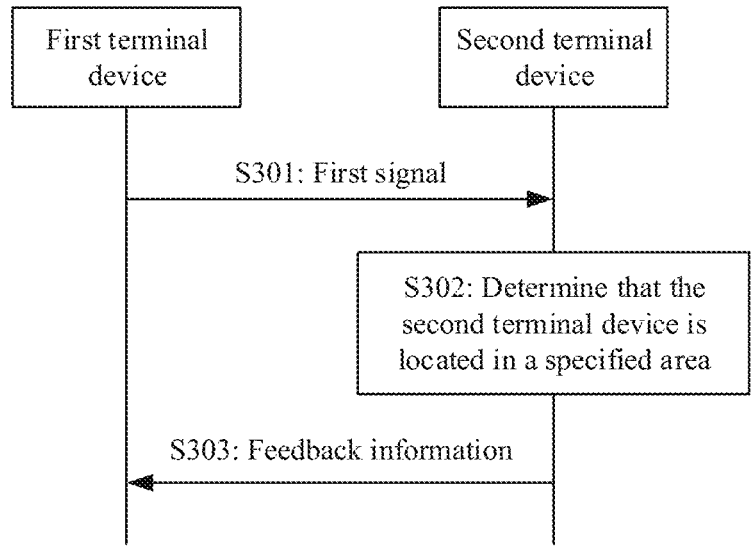
FIG. 3 is a schematic flowchart of a communication method according to an embodiment of this application.
Figure 4:
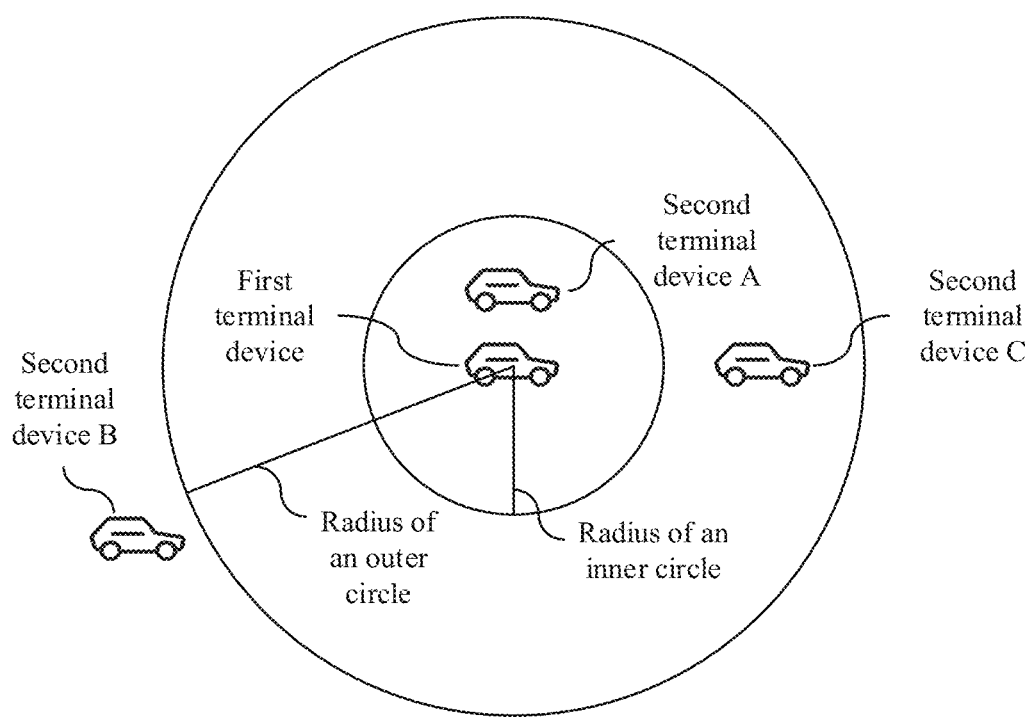
FIG. 4 is a schematic diagram 1 of a scenario to which a communication method is applicable according to an embodiment of this application.
Figure 5:
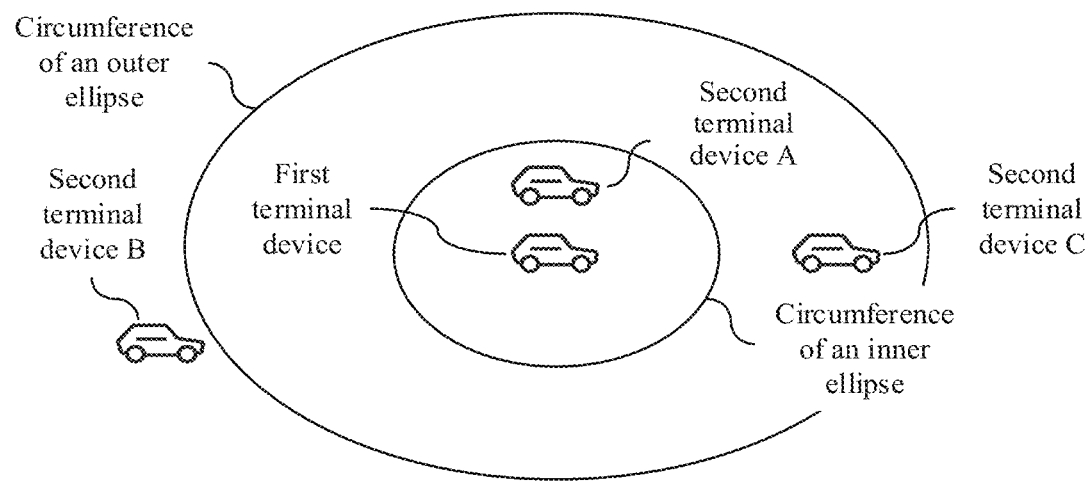
FIG. 5 is a schematic diagram 2 of a scenario to which a communication method is applicable according to an embodiment of this application.

The following describes in detail the communication method provided in the embodiments of this application with reference to FIG. 3 to FIG. 5.

FIG. 3 is a schematic flowchart of a communication method according to an embodiment of this application. The communication method may be applied to any terminal device in FIG. 1, for example, the first terminal device in FIG. 1 or the communication apparatus 200 shown in FIG. 2, to complete direct communication with another terminal device, for example, the second terminal device in FIG. 1, on a sidelink. As shown in FIG. 3, the communication method includes the following operations.

S301: A first terminal device sends a first signal to a second terminal device. Correspondingly, the second terminal device receives the first signal from the first terminal device.

In one embodiment, the first signal includes one or more of data, a control signal, and a reference signal.

For example, the first terminal device may send the data to at least one and/or at least one type of second terminal device on the sidelink. The at least one second terminal device may include at least one of the following types of second terminal devices: at least one second terminal device having a point-to-point service with the first terminal device, for example, a unicast service; and at least one second terminal device having a point-to-multipoint service with the first terminal device, for example, a broadcast service, a multicast service, or a groupcast service. A type and a quantity of services of the first terminal device and a type and a quantity of second terminals that have the foregoing services with the first terminal device are not limited in this embodiment of this application.

For example, the first terminal device may send the control signal to the at least one and/or the at least one type of second terminal device on the sidelink.

For example, the first terminal device may send the reference signal to the at least one and/or the at least one type of second terminal device on the sidelink.

In one embodiment, the first terminal device may broadcast location information of the first terminal device. The location information of the first terminal device may be location information determined based on information provided by a global navigation satellite system (GNSS). The location information may be absolute coordinates of a location in which the first terminal device is located, for example, longitude and latitude coordinates. The location information may alternatively be an identifier of a preset area in which the first terminal device is located and a position offset (which may also be referred to as relative coordinates) of the first terminal device relative to a reference point in the preset area. The preset area may be a zone whose length and width are respectively L and W, and the area identifier of the preset area corresponds to absolute coordinates of the reference point in the preset area. The area identifier may be an identifier of a physical cell accessed by the first terminal device, an identifier of a base station accessed by the first terminal device, an identifier of a service area accessed by the first terminal device, or the like. The reference point may be a geometric center, a vertex, or the like of the preset area. For example, the reference point in the zone may be a diagonal intersection point, any vertex, a midpoint of any edge, or the like of the zone.

It should be noted that there is a one-to-one correspondence between the area identifier of the preset area and the relative coordinates and the absolute coordinates of the preset area; and the absolute coordinates of the preset area may be calculated based on the area identifier of the preset area and the relative coordinates.

In one embodiment, the first terminal device enables radio resource control signaling, media access control signaling, a master information block, a system information block, or physical control information to carry longitude and/or latitude information of the first terminal device.

In one embodiment, the first terminal device enables the radio resource control signaling, the media access control signaling, the master information block, the system information block, or the physical control information to carry index of an area in which the first terminal device is located.

In one embodiment, the first terminal device enables the radio resource control signaling, the media access control signaling, the master information block, the system information block, or the physical control information to carry a longitude offset and/or a latitude offset of the first terminal device in a preset area.

In one embodiment, when network coverage is available, the first terminal device may also report the location information of the first terminal device to a network device, for example, a base station, and the network device broadcasts the location information of the first terminal device.

Correspondingly, the second terminal device may separately receive, on the sidelink or a downlink, the location information of the first terminal device from the first terminal device or the network device.

In one embodiment, the second terminal device receives the longitude and/or the latitude information of the first terminal device that are/is carried by the radio resource control signaling, the media access control signaling, the master information block, the system information block, or the physical control information and that is sent by the first terminal device or the network device.

In one embodiment, the second terminal device receives the index of the area in which the first terminal device is located that is carried by the radio resource control signaling, the media access control signaling, the master information block, the system information block, or the physical control information and that is sent by the first terminal device or the network device.

In one embodiment, the second terminal device receives the longitude offset and/or the latitude offset of the first terminal device that are/is carried by the radio resource control signaling, the media access control signaling, the master information block, the system information block, or the physical control information and that is sent by the first terminal device or the network device.

It should be noted that in an application scenario in which a location update speed of a terminal device is relatively fast, for example, a V2X communication scenario and a high-speed railway communication scenario, the first terminal device and/or the network device may need to update the location information of the first terminal device in a timely manner. For example, the location information of the first terminal device may be periodically broadcast within a relatively short update period, for example, 5 ms, 10 ms, or 20 ms. For another example, when the first terminal device learns that a distance between the first terminal device and the second terminal device may change greatly, for example, the first terminal device is moving at an accelerated speed, or a movement direction of the first terminal device changes greatly, the first terminal device may broadcast the location information of the first terminal device in real time.

S302: The second terminal device determines that the second terminal device is located in a specified area.

In one embodiment, the specified area may be determined based on the distance between the second terminal device and the first terminal device and a lower distance threshold and/or an upper distance threshold. The upper distance threshold is greater than the lower distance threshold.

Specifically, the second terminal device may calculate the distance between the second terminal device and the first terminal device based on location information of the second terminal device and the location information of the first terminal device, and determine, based on a result obtained through comparison between the distance with the upper distance threshold and/or the lower distance threshold, a specified area in which the second terminal device is located. The location information of the first terminal device may be received from the first terminal device or the network device. For content and an obtaining manner of obtaining the location information of the second terminal device, refer to the content and an obtaining manner of obtaining the location information of the first terminal device. Details are not described herein again.

In one embodiment, it is assumed that longitude and latitude coordinates of the first terminal are $(X_1, Y_1)$, and longitude and latitude coordinates of the second terminal device are $(X_2, Y_2)$, therefore, the second terminal device may calculate the distance D (distance) between the second terminal device and the first terminal device according to the following formula:

$$D=\sqrt{(X_2-X_1)^2+(Y_2-Y_1)^2}.$$

It should be noted that if a requirement for calculation precision is relatively high, the longitude and latitude coordinates of the first terminal device $(X_1, Y_1)$ may occupy relatively large signaling and resource overheads. To reduce signaling and the resource overheads, a geographic area may be divided into a plurality of zones (zone) whose length (length) and width (width) are respectively L and W. The first terminal device may broadcast an identifier of the zone (zone identifier, ZID) in which the first terminal device is located and an offset, for example, relative coordinates $(x_1, y_1)$, of the first terminal in the zone. $(x_1, y_1)$ is a modulus value of the longitude and latitude coordinates of the first terminal device in the zone, namely, $x_1=(X_1)\mod(L)$ and $y_1=(Y_1)\mod(W)$. Compared with $(X_1, Y_1)$, a value range of the modulus value $(x_1, y_1)$ in the zone is much smaller, so that signaling overheads of the location information of the first terminal device can be reduced.

The second terminal device calculates the distance D, based on the received coordinate information $(x_1, y_1)$ of the first terminal device and the identifier ZID 1 of the zone, and relative coordinates $(x_2, y_2)$ of the second terminal device in a zone 2 in which the second terminal device is located and an identifier ZID 2 of the zone, by using the following formula:

$$D=\sqrt{(x_2-y_1)^2+(x_2-y_1)^2}+(ZID2-ZID1)\times G.$$

G is a size of a zone, for example, may be represented by a diagonal length: $G=\sqrt{L^2+W^2}$. When the zone is large, a front half of the formula can be ignored. When the identifier of the zone in which the second terminal device is located and the identifier of the zone in which the first terminal device is located are the same, namely, ZID 2=ZID 1, the last half of the foregoing distance calculation formula is zero.

In one embodiment, when an area of the zone is relatively small, absolute coordinates of a reference point in a first zone and absolute coordinates of a reference point in a second zone may also be obtained based on an area identifier of the first zone in which the first terminal device is located and an area identifier of the second zone in which the second terminal device is located. Then, calculating the distance between the second terminal device and the first terminal device is simplified to calculating a distance between the two reference points. In this case, the first terminal device only needs to broadcast or report an area identifier of a zone in which the first terminal device is currently located when the zone in which the first terminal device is located changes, so that signaling overheads and resource overheads can be greatly reduced. In this case, the zone may also be replaced with a regular hexagon area, and a reference point may be a geometric center of the regular hexagon area.

It is easy to understand that if the second terminal device and the first terminal device are in a same zone, the distance may be obtained through calculation directly based on relative coordinates $(x_1, y_1)$ of the first terminal device in the zone and relative coordinates $(x_2, y_2)$ of the second terminal device in the zone, namely, $D=\sqrt{(x_2-y_1)^2+(x_2-y_1)^2}$.

It is easy to understand that the second terminal device may also send the location information of the second terminal device, so that another terminal device, for example, the first terminal device, determines a distance between the another terminal device and the second terminal device based on the location information of the second terminal device. Details are not described herein again.

FIG. 4 is a schematic diagram of a communication scenario according to an embodiment of this application. As shown in FIG. 4, the scenario includes three specified areas: an inner circle area, an annular area, and an outer circle area. The three specified areas are divided based on a lower distance threshold and an upper distance threshold. The lower distance threshold is used to determine a radius of an inner circle, the radius of the inner circle is used to determine a circumference of the inner circle, and the circumference of the inner circle is used to divide the inner circle area and the annular area. The upper distance threshold is used to determine a radius of an outer circle, the radius of the outer circle is used to determine a circumference of the outer circle, and the circumference of the outer circle is used to divide the annular area and the outer circle area.

For example, when the distance between the second terminal device and the first terminal device is less than or equal to the lower distance threshold, the second terminal device may determine that the second terminal device, for example, a second terminal device A in FIG. 4, is located in the inner circle area. For another example, when the distance between the second terminal device and the first terminal device is greater than or equal to the upper distance threshold, the second terminal device may determine that the second terminal device, for example, a second terminal device B in FIG. 4, is located in the outer circle area. For still another example, when the distance between the second terminal device and the first terminal device is greater than or equal to the lower distance threshold and less than or equal to the upper distance threshold, the second terminal device may determine that the second terminal device, for example, a second terminal device C in FIG. 4, is located in the annular area.

In another embodiment, the specified area may alternatively be determined based on strength of a signal received by the second terminal device from the first terminal device, a lower signal strength threshold and/or an upper signal strength threshold. The upper signal strength threshold is greater than the lower signal strength threshold. The strength of the signal may be reference signal received power (reference signal received power, RSRP), a received signal strength indicator (received signal strength indicator, RSSI), or reference signal received quality (reference signal received quality, RSRQ) received by the second terminal device; or may be another technical indicator used to indicate the strength of the received signal. This is not limited in this embodiment of this application.

Specifically, the second terminal device may determine, based on a result obtained through comparison between the strength of the signal received by the second terminal device from the first terminal device with the lower signal strength threshold and/or the upper signal strength threshold, a specified area in which the second terminal device is located.

The three areas in the communication scenario shown in FIG. 4 may alternatively be divided based on the lower signal strength threshold and/or the upper signal strength threshold. As shown in FIG. 4, the upper signal strength threshold is used to determine the radius of the inner circle, the radius of the inner circle is used to determine the circumference of the inner circle, and the circumference of the inner circle is used to divide the inner circle area and the annular area. The lower signal strength threshold is used to determine the radius of the outer circle, the radius of the outer circle is used to determine the circumference of the outer circle, and the circumference of the outer circle is used to divide the annular area and the outer circle area.

For example, when the strength of the signal received by the second terminal device from the first terminal device is greater than or equal to the upper signal strength threshold, the second terminal device may determine that the second terminal device, for example, the second terminal device A in FIG. 4, is located in the inner circle area. For another example, when the strength of the signal received by the second terminal device from the first terminal device is less than or equal to the lower signal strength threshold, the second terminal device may determine that the second terminal device, for example, the second terminal device B in FIG. 4, is located in the outer circle area. For still another example, when the strength of the signal received by the second terminal device from the first terminal device is greater than or equal to the lower signal strength threshold and less than or equal to the upper signal strength threshold, the second terminal device may determine that the second terminal device, for example, the second terminal device C in FIG. 4, is located in the annular area.

It should be noted that the specified areas in the communication scenario shown in FIG. 4 are described by using concentric circle areas as an example. Actually, the specified area can also be defined by using an area of another geometry. The another geometry may be an elliptical area, a sector area, a rectangular area, or the like. For example, in a highway scenario shown in FIG. 5, elliptical areas in which the first terminal device is a center and major axes are consistent with a front-to-back extension direction of a highway is used (for example, implemented by using front-to-back beamforming). Three specified areas, namely, an inner elliptical area, an annular elliptical area and an outer elliptical area based on a circumference of an inner ellipse and a circumference of an outer ellipse. A person skilled in the art should further understand that, given that channel conditions and propagation manners of wireless signals in various directions may be different, for example, whether there is an obstacle on a channel, different signals have different attenuation speeds, different signals have different propagation manners such as direct radiation, diffraction, scattering, transmission, multipath, and the like, and whether a beamforming technology is used, demarcation lines of the specified areas determined by using the upper signal strength threshold and/or the lower signal strength threshold are likely not to be circles or ellipses.

In addition, the communication scenarios shown in FIG. 4 and FIG. 5 only involve three specified areas divided by using a maximum of two thresholds (the upper distance threshold and the lower distance threshold, or the upper signal strength threshold and the lower signal strength threshold). In actual application, a quantity of thresholds and a quantity of specified areas may be greater. Details are not described herein again.

In addition, the upper distance threshold and the lower distance threshold, and the upper signal strength threshold and the lower signal strength threshold may also be used in combination, for example, the lower distance threshold and the upper signal strength threshold are used together, or the upper distance threshold and the lower signal strength threshold are used together. As long as different specified areas can be distinguished, a manner in which the thresholds are used is not limited in this embodiment of this application.

In this embodiment of this application, the upper distance threshold and the lower distance threshold, and the upper signal strength threshold and the lower signal strength threshold may be determined and broadcast by the first terminal device, or may be determined and reported by the first terminal device to the base station, and then be broadcast by the base station. Correspondingly, the second terminal device may receive the upper distance threshold and the lower distance threshold, and the upper signal strength threshold and the lower signal strength threshold broadcast by the first terminal device and/or the base station. Alternatively, the upper distance threshold and the lower distance threshold, and the upper signal strength threshold and the lower signal strength threshold may be determined by each terminal device according to a preset threshold determining rule. A subject for determining the upper distance threshold and the lower distance threshold, and the upper signal strength threshold and the lower signal strength threshold is not limited in this embodiment of this application.

The following describes in detail a method for determining the upper distance threshold and the lower distance threshold and a method for determining the upper signal strength threshold and the lower signal strength threshold by using the annular area in the communication scenario shown in FIG. 4. The upper distance threshold may be determined based on quality of service or a priority of service, and is used to ensure specified quality of service and transmission of a high-priority service. The lower distance threshold may be determined based on a resource of feedback information or a feedback quantity, and is used to ensure that the first terminal can obtain a specific feedback amount and feedback overheads are not excessively large, so that the resource of feedback information is properly used. The lower distance threshold corresponds to the radius of the inner circle of the annular area, and the upper distance threshold corresponds to the radius of the outer circle of the annular area. The determining method may be stored in various forms such as an application program, an executable script, a configuration file, or a spreadsheet in each terminal device or the base station for backup according to a distance threshold determining rule.

In one embodiment, the following rule 1 may be used to determine the upper distance threshold and the lower distance threshold.

Rule 1: The upper distance threshold is positively correlated with the quality of service (QoS), the priority of service (POS), or the quantity of resources of feedback information; and/or the lower distance threshold is negatively correlated with the quality of service QoS, the priority of service, or the quantity of resources of feedback information.

For example, the quality of service may include one or more of the following: a minimum bit error rate, a maximum delay, a minimum data rate, and the like. It is easy to understand that for a service that has a high requirement on reliability, a minimum bit error rate with a relatively small value may be set, for example, 1/10000. For a service that has a high requirement on a data transmission delay, for example, an online game service and an autonomous driving service, a maximum delay with a relatively small value may be set, for example, 1 millisecond (ms) or 2 ms. For a service that has a high requirement on a data rate, for example, an online video playback service, a minimum data rate with a relatively large value may be set, for example, 10 megabits per second (Mbps) or 100 Mbps.

For example, the priority of service may be a priority defined for a proximity-based service (ProSe) (PPPP) on the sidelink. Currently, there are eight priorities.

For example, the resource of feedback information is a radio resource that can be used to carry feedback information on the sidelink. The radio resource may include at least one of a time domain resource, a frequency domain resource, a code domain resource, a space domain resource, and a power domain resource. The frequency domain resource includes, for example, an index of a resource block RB, a quantity of RBs, an index of a subchannel, and an identifier of an RB in a subchannel. The time domain resource includes, for example, a sign location (including a commanding sign or a terminating sign), a quantity of signs, a timeslot location (including a start timeslot or an end timeslot), a quantity of timeslots, and the like. The code domain resource includes a root sequence, a mask, scrambling code, a cyclic shift, a comb tooth, and the like. The space domain resource includes a codeword, a stream, a layer, a quantity of antennas, numbers of antenna ports, a quantity of antenna ports, and the like. The power domain resource includes a power value, a power range, a power offset, and a power threshold.

In this embodiment of this application, the radio resource may be one or more groups of resources or one or more resource pools dynamically configured or preconfigured by the network device in the terminal device. This is not limited in this embodiment of this application.

For example, Table 1 to Table 3 respectively show a correspondence between the quality of service QoS (QoS x) and the upper distance threshold, a correspondence between the priority of service PPPP (PPPP x) and the upper distance threshold, or a correspondence between the quantity of resources of feedback information (FIBR x) and the upper distance threshold. A larger value of "x" indicates higher quality of service or a higher priority of service, or a larger quantity of resources of feedback information.

Refer to Table 1 and Table 2. Higher quality of service or a higher priority of service indicates a higher requirement on communication reliability, and indicates that more second terminal devices need to send feedback information for reference by the first terminal device. Correspondingly, a range of the annular area needs to be extended. In one embodiment, the range of the annular area may be extended outward. As shown in Table 1 and Table 2, the upper distance threshold is increased from R 2 to R 3, to extend the annular area. Conversely, lower quality of service or a lower priority of service indicates a lower requirement on communication reliability, and indicates a quantity of second terminal devices that can send feedback information may be appropriately reduced, to reduce resource consumption of feedback information. In one embodiment, the range of the annular area may be narrowed inward. As shown in Table 1 and Table 2, the upper distance threshold is reduced from R 3 to R 2, to narrow the annular area.

It can be learned from Table 3 that, a larger quantity of resources of feedback information may allow more second terminal devices to send feedback information for reference by the first terminal device, thereby improving communication reliability. Correspondingly, the range of the annular area may be extended. In one embodiment, the range of the annular area may be extended outward. As shown in Table 3, the upper distance threshold is increased from R 2 to R 3, to extend the annular area. Conversely, a smaller quantity of resources of feedback information indicates that an amount of feedback information needs to be reduced. For example, the quantity of second terminal devices that can send feedback information may be appropriately reduced, to reduce resource consumption of feedback information. In one embodiment, the range of the annular area may be narrowed inward. As shown in Table 3, the upper distance threshold is reduced from R 3 to R 2, to narrow the annular area.

TABLE 1

| Quality of service (from low to high) | Upper distance threshold |
|---|---|
| QoS 1 | R 1 |
| QoS 2 (QoS 2 > QoS 1) | R 2 (R 2 > R 1) |
| QoS 3 (QoS 3 > QoS 2) | R 3 (R 3 > R 2) |
| ... | ... |

TABLE 2

| Priority of service (from low to high) | Upper distance threshold |
|---|---|
| PPPP 1 | R 1 |
| PPPP 2 (PPPP 2 > PPPP 1) | R 2 (R 2 > R 1) |
| PPPP 3 (PPPP 3 > PPPP 2) | R 3 (R 3 > R 2) |
| ... | ... |

TABLE 3

| Resource of feedback information (from less to more) | Upper distance threshold |
|---|---|
| FBIR 1 | R 1 |
| FBIR 2 (FBIR 2 > FBIR 1) | R 2 (R 2 > R 1) |
| FBIR 3 (FBIR 3 > FBIR 2) | R 3 (R 3 > R 2) |
| ... | ... |

For example, Table 4 to Table 6 respectively show a correspondence between the quality of service QoS (QoS x) and the lower distance threshold, a correspondence between the priority of service PPPP (PPPP x) and the lower distance threshold, or a correspondence between the quantity of resources of feedback information (FIBR x) and the lower distance threshold. A larger value of "x" indicates higher quality of service or a higher priority of service, or a larger quantity of resources of feedback information.

TABLE 4

| Quality of service (from low to high) | Lower distance threshold |
| --- | --- |
| QoS 1 | R 4 |
| QoS 2 (QoS 2 > QoS 1) | R 5 (R 5 < R 4) |
| QoS 3 (QoS 3 > QoS 2) | R 6 (R 6 < R 5) |
| ... | ... |

TABLE 5

| Priority of service (from low to high) | Lower distance threshold |
| --- | --- |
| PPPP 1 | R 4 |
| PPPP 2 (PPPP 2 > PPPP 1) | R 5 (R 5 < R 4) |
| PPPP 3 (PPPP 3 > PPPP 2) | R 6 (R 6 < R 5) |
| ... | ... |

Refer to Table 4 and Table 5. Higher quality of service or a higher priority of service indicates a higher requirement on communication reliability, and indicates that more second terminal devices need to send feedback information for reference by the first terminal device. Correspondingly, the range of the annular area needs to be extended. In one embodiment, the range of the annular area may be extended inward. As shown in Table 4 and Table 5, the lower distance threshold is reduced from R 6 to R 5, to extend the annular area. Conversely, lower quality of service or a lower priority of service indicates a lower requirement on communication reliability, and indicates the quantity of second terminal devices that can send feedback information may be appropriately reduced, to reduce resource consumption of feedback information. In one embodiment, the range of the annular area may be narrowed outward. As shown in Table 4 and Table 5, the lower distance threshold is increased from R 4 to R 5, to narrow the annular area.

It can be learned from Table 6 that, a larger quantity of resources of feedback information may allow more second terminal devices to send feedback information for reference by the first terminal device, thereby improving communication reliability. Correspondingly, the range of the annular area may be extended. In one embodiment, the range of the annular area may be extended inward. As shown in Table 6, the lower distance threshold is reduced from R 5 to R 4, to extend the annular area. Conversely, a smaller quantity of resources of feedback information indicates that the amount of feedback information needs to be reduced. For example, the quantity of second terminal devices that can send feedback information may be appropriately reduced, to reduce resource consumption of feedback information. In one embodiment, the range of the annular area may be narrowed outward. As shown in Table 6, the lower distance threshold is increased from R 4 to R 5, to narrow the annular area.

TABLE 6

| Resource of feedback information (from less to more) | Lower distance threshold |
| --- | --- |
| FBIR 1 | R 4 |
| FBIR 2 (FBIR 2 > FBIR 1) | R 5 (R 5 < R 4) |
| FBIR 3 (FBIR 3 > FBIR 2) | R 6 (R 6 < R 5) |
| ... | ... |

It should be noted that the quality of service QoS may be represented by using different technical indicators such as a bit error rate, a delay, and a data rate, and correspondences between the different technical indicators with different values and the quality of service may be different. For example, for the bit error rate and the delay, a smaller value indicates higher quality of service QoS; but for the data rate, a larger value indicates higher quality of service.

Similarly, the priority of service may also be expressed in different forms. For example, a larger value of the priority of service indicates a higher priority, or a smaller value of the priority of service indicates a higher priority. Correspondences between the service priorities expressed in different forms with different values and the quality of service may also be different.

In this embodiment of this application, the upper distance threshold and/or the lower distance threshold may alternatively be determined based on the feedback information. Details are described below. The feedback information may include an acknowledgment ACK or a negative acknowledgment NACK, and/or channel state information CSI.

The CSI includes at least one piece of the following information: a channel quality indicator (CQI), a precoding matrix indicator (precoding matrix indicator, PMI), a rank indicator (rank indicator, RI), reference signal received power (reference signal received power, RSRP), reference signal received quality (reference signal received quality, RSRQ), a pathloss (Pathloss), a sounding reference signal SRS resource indicator (sounding reference signal resource indicator, SRI), a channel state information-reference signal CSI-RS resource indicator (channel state information-reference signal resource indicator, CRI), a received signal strength indicator (received signal strength indicator, RSSI), a precoding type indicator (precoding type indicator, PTI), a direction of vehicle movement, an interference condition, and the like.

In one embodiment, the CSI may include a wideband CSI and/or a subband CSI of at least one piece of the foregoing information.

In one embodiment, the CSI may include periodic CSI, semi-persistent CSI, or aperiodic CSI of at least one piece of the foregoing information.

In one embodiment, the CSI may include layer 1 CSI and/or layer 3 CSI of at least one piece of the foregoing information.

In another embodiment, the following rule 2 may be used to determine the upper distance threshold and the lower distance threshold.

Rule 2: The upper distance threshold is negatively correlated with a quantity of negative acknowledgments NACKs or an amount of channel state information CSI less than or equal to a first threshold; and/or the lower distance threshold is positively correlated with the quantity of negative acknowledgments NACKs or the amount of channel state information CSI less than or equal to the first threshold. When a first specified time period is one timeslot, the quantity of negative acknowledgments NACKs may be a quantity of timeslots in which negative acknowledgments NACKs are received by the first terminal device within the first specified time period. Alternatively, when the first specified time period is a plurality of timeslots, the quantity of negative acknowledgments NACKs may be the quantity of timeslots in which the negative acknowledgments NACKs are received by the first terminal device within the first specified time period. The plurality of timeslots may be a plurality of consecutive timeslots, or a time window (time window) including a plurality of consecutive timeslots, for example, 10 ms or 50 ms. This is not limited in this embodiment of this application.

In another embodiment, the first threshold may be preconfigured, or configured by the base station or the first terminal device by using the radio resource control signaling, the media access control signaling, the master information block, the system information block, or the physical control information.

It should be noted that the timeslot in which the negative acknowledgment NACK is received is a timeslot in which at least one negative acknowledgment NACK is received. That is, as long as a negative acknowledgment NACK is received in the timeslot, the timeslot may be considered as a timeslot in which the negative acknowledgment NACK is received. Only when all HARQ acknowledgments received in a timeslot are acknowledgments ACKs, the timeslot can be considered as a timeslot in which an acknowledgment ACK is received.

For example, Table 7 and Table 8 respectively show a correspondence between the quantity of negative acknowledgments (NACKs) (NACK x) and the upper distance threshold, or a correspondence between the amount of channel state information (CSI) (CSI x) less than or equal to the first threshold and the upper distance threshold. A larger value of "x" indicates a larger quantity.

TABLE 7

| Quantity of NACKs (from less to more) | Upper distance threshold |
| --- | --- |
| NACK 1 | R 1 |
| NACK 2 (NACK 2 > NACK 1) | R 2 (R 2 > R 1) |
| NACK 3 (NACK 3 > NACK 2) | R 3 (R 3 > R 2) |
| ... | ... |

TABLE 8

| CSI less than or equal to the first threshold (from less to more) | Upper distance threshold |
| --- | --- |
| CSI 1 | R 1 |
| CSI 2 (CSI 2 > CSI 1) | R 2 (R 2 > R 1) |
| CSI 3 (CSI 3 > CSI 2) | R 3 (R 3 > R 2) |
| ... | ... |

Refer to Table 7 and Table 8. A larger quantity of negative acknowledgments NACKs or a larger amount of channel state information CSI less than or equal to the first threshold may indicate a larger quantity of second terminal devices that actually send feedback information, and a larger value of the upper distance threshold. However, in actual application, the first terminal device still needs to resend data even if the first terminal device receives only one negative acknowledgment NACK. In other words, only one negative acknowledgment NACK is needed. Therefore, to reduce the amount of feedback information and reduce signaling consumption and resource consumption, the range of the annular area needs to be narrowed. In one embodiment, the range of the annular area may be narrowed inward. As shown in Table 7 and Table 8, the upper distance threshold is reduced from R 3 to R 2, to narrow the annular area.

For example, Table 9 and Table 10 respectively show a correspondence between the quantity of negative acknowledgments NACKs (NACK x) and the lower distance threshold, or a correspondence between the amount of channel state information CSI (CSI x) less than or equal to the first threshold and the lower distance threshold. A larger value of "x" indicates a larger quantity.

Refer to Table 9 and Table 10. A larger quantity of negative acknowledgments NACKs or a larger amount of channel state information CSI less than or equal to the first threshold may indicate a larger quantity of second terminal devices that actually send feedback information, and a smaller value of the lower distance threshold. However, in actual application, the first terminal device still needs to resend data even if the first terminal device receives only one negative acknowledgment NACK. In other words, only one negative acknowledgment NACK is needed. Therefore, to reduce the amount of feedback information and reduce signaling consumption and resource consumption, the range of the annular area needs to be narrowed. In one embodiment, the range of the annular area may be narrowed outward. As shown in Table 9 and Table 10, the lower distance threshold is increased from R 4 to R 5, to narrow the annular area.

TABLE 9

| Quantity of NACKs (from less to more) | Lower distance threshold |
| --- | --- |
| NACK 1 | R 4 |
| NACK 2 (NACK 2 > NACK 1) | R 5 (R 5 < R 4) |
| NACK 3 (NACK 3 > NACK 2) | R 6 (R 6 < R 5) |
| ... | ... |

TABLE 10

| CSI less than or equal to the first threshold (from less to more) | Lower distance threshold |
| --- | --- |
| CSI 1 | R 4 |
| CSI 2 (CSI 2 > CSI 1) | R 5 (R 5 < R 4) |
| CSI 3 (CSI 3 > CSI 2) | R 6 (R 6 < R 5) |
| ... | ... |

In still another embodiment, the following rule 3 may be used to determine the upper distance threshold and the lower distance threshold.

Rule 3: The upper distance threshold is positively correlated with a quantity of acknowledgments ACKs or an amount of CSI information greater than or equal to a second threshold; and/or the lower distance threshold is positively correlated with the quantity of acknowledgments ACKs or the amount of CSI information greater than or equal to the second threshold. In one embodiment, the quantity of acknowledgments ACKs may be a quantity of timeslots in which all HARQ acknowledgments received by the first terminal device within a second specified time period are acknowledgments ACKs. The second specified time period may generally include a plurality of timeslots, for example, may be a plurality of consecutive timeslots or a time window including a plurality of consecutive timeslots, for example, 10 ms or 50 ms. This is not limited in this embodiment of this application. The second threshold is greater than the first threshold.

In another embodiment, the second threshold may be preconfigured, or configured by the base station or the first terminal device by using the radio resource control signaling, the media access control signaling, the master information block, the system information block, or the physical control information.

For example, Table 11 to Table 14 respectively show a correspondence between the quantity of acknowledgments ACKs (ACK x) and the upper distance threshold, or a correspondence between the amount of channel state information CSI (CSI x) greater than or equal to the second threshold and the upper distance threshold. A larger value of "x" indicates a larger quantity.

Refer to Table 11 to Table 14. A larger quantity of acknowledgments ACKs or a larger amount of channel state information CSI greater than or equal to the second threshold indicates that a channel condition of the annular area is better, and corresponding data transmission quality is better, for example, no bit error occurs. In other words, a setting of the annular area may be inappropriate. For example, a distance between the annular area and the first terminal device is extremely close, and feedback information sent by the second terminal device in the annular area has no reference value. In addition, another risk may also exist. Refer to FIG. 4. It is assumed that the first terminal device resends data only based on the negative acknowledgment NACK sent by the second terminal device in the annular area or the channel state information CSI less than or equal to the first threshold. In this case, the second terminal device in the outer circle area is not allowed to send feedback information. In addition, when the second terminal device in the outer circle area fails to receive data, the first terminal device does not resend data. As a result, the second terminal device in the outer circle area has no opportunity to receive data again. As a result, reliability of direct communication between the terminal devices is degraded. To resolve the foregoing problem, the annular area may be moved outward as a whole, to be specific, the lower distance threshold and the upper distance threshold are increased at the same time. As shown in Table 11 and Table 12, the upper distance threshold is increased from R 1 to R 2; and/or as shown in Table 13 and Table 14, the lower distance threshold is increased from R 5 to R 6, to improve reliability of direct communication between the terminal devices.

TABLE 11

| Quantity of ACKs (from less to more) | Upper distance threshold |
| --- | --- |
| ACK 1 | R 1 |
| ACK 2 (ACK 2 > ACK 1) | R 2 (R 2 > R 1) |
| ACK 3 (ACK 3 > ACK 2) | R 3 (R 3 > R 2) |
| ... | ... |

TABLE 12

| CSI greater than or equal to the second threshold (from less to more) | Upper distance threshold |
| --- | --- |
| CSI 1 | R 1 |
| CSI 2 (CSI 2 > CSI 1) | R 2 (R 2 > R 1) |
| CSI 3 (CSI 3 > CSI 2) | R 3 (R 3 > R 2) |
| ... | ... |

TABLE 13

| Quantity of ACKs (from less to more) | Lower distance threshold |
| --- | --- |
| ACK 1 | R 4 |
| ACK 2 (ACK 2 > ACK 1) | R 5 (R 5 > R 4) |
| ACK 3 (ACK 3 > ACK 2) | R 6 (R 6 > R 5) |
| ... | ... |

TABLE 14

| CSI greater than or equal to the second threshold (from less to more) | Lower distance threshold |
| --- | --- |
| CSI 1 | R 4 |
| CSI 2 (CSI 2 > CSI 1) | R 5 (R 5 > R 4) |
| CSI 3 (CSI 3 > CSI 2) | R 6 (R 6 > R 5) |
| ... | ... |

The following describes in detail the method for determining the upper signal strength threshold and the lower signal strength threshold by using the annular area in the communication scenario shown in FIG. 4. The upper signal strength threshold may be determined based on the resource of feedback information or the feedback quantity, and is used to ensure that the first terminal can obtain a specific feedback amount, and feedback overheads are not excessively large, so that the resource of feedback information is properly used. The lower signal strength threshold may be determined based on the quality of service or the priority of service, and is used to ensure the specified quality of service and transmission of the high-priority service. The upper signal strength threshold corresponds to the radius of the inner circle of the annular area, and the lower signal strength threshold corresponds to the radius of the outer circle of the annular area. The determining method may be stored in various forms such as the application program, the executable script, the configuration file, or the spreadsheet in each terminal device or the base station for backup according to a signal strength threshold determining rule.

In one embodiment, the following rule 4 may be used to determine the upper signal strength threshold and the lower signal strength threshold.

Rule 4: The upper signal strength threshold is positively correlated with the quality of service QoS, the priority of service POS, or the quantity of resources of feedback information; and/or the lower signal strength threshold is negatively correlated with the quality of service QoS, the priority of service, or the quantity of resources of feedback information.

For example, Table 15 to Table 17 respectively show a correspondence between the quality of service QoS (QoS x) and the upper signal strength threshold, a correspondence between the priority of service PPPP (PPPP x) and the upper signal strength threshold, or a correspondence between the quantity of resources of feedback information (FIBR x) and the upper signal strength threshold. A larger value of "x" indicates higher quality of service or a higher priority of service, or a larger quantity of resources of feedback information.

Refer to Table 15 and Table 16. Higher quality of service or a higher priority of service indicates a higher requirement on communication reliability, and indicates that more second terminal devices need to send feedback information for reference by the first terminal device. Correspondingly, the range of the annular area needs to be extended. In one embodiment, the range of the annular area may be extended inward. As shown in Table 15 and Table 16, the upper signal strength threshold is increased from RSRP 2 to RSRP 3, to extend the annular area. Conversely, lower quality of service or a lower priority of service indicates a lower requirement on communication reliability, and indicates the quantity of second terminal devices that can send feedback information may be appropriately reduced, to reduce resource consumption of feedback information. In one embodiment, the range of the annular area may be narrowed outward. As shown in Table 15 and Table 16, the upper signal strength threshold is reduced from RSRP 3 to RSRP 2, to narrow the annular area.

TABLE 15

| Quality of service (from low to high) | Upper signal strength threshold |
|---|---|
| QoS 1 | RSRP 1 |
| QoS 2 (QoS 2 > QoS 1) | RSRP 2 (RSRP 2 > RSRP 1) |
| QoS 3 (QoS 3 > QoS 2) | RSRP 3 (RSRP 3 > RSRP 2) |
| ... | ... |

TABLE 16

| Priority of service (from low to high) | Upper signal strength threshold |
|---|---|
| PPPP 1 | RSRP 1 |
| PPPP 2 (PPPP 2 > PPPP 1) | RSRP 2 (RSRP 2 > RSRP 1) |
| PPPP 3 (PPPP 3 > PPPP 2) | RSRP 3 (RSRP 3 > RSRP 2) |
| ... | ... |

TABLE 17

| Resource of feedback information (from less to more) | Upper signal strength threshold |
|---|---|
| FBIR 1 | RSRP 1 |
| FBIR 2 (FBIR 2 > FBIR 1) | RSRP 2 (RSRP 2 > RSRP 1) |
| FBIR 3 (FBIR 3 > FBIR 2) | RSRP 3 (RSRP 3 > RSRP 2) |
| ... | ... |

It can be learned from Table 17 that, a larger quantity of resources of feedback information may allow more second terminal devices to send feedback information for reference by the first terminal device, thereby improving communication reliability. Correspondingly, the range of the annular area may be extended. In one embodiment, the range of the annular area may be extended inward. As shown in Table 17, the upper signal strength threshold is increased from RSRP 2 to RSRP 3, to extend the annular area. Conversely, a smaller quantity of resources of feedback information indicates that the amount of feedback information needs to be reduced. For example, the quantity of second terminal devices that can send feedback information may be appropriately reduced, to reduce resource consumption of feedback information. In one embodiment, the range of the annular area may be narrowed outward. As shown in Table 17, the upper signal strength threshold is reduced from RSRP 3 to RSRP 2, to narrow the annular area.

For example, Table 18 to Table 20 respectively show a correspondence between the quality of service QoS (QoS x) and the lower signal strength threshold, a correspondence between the priority of service PPPP (PPPP x) and the lower signal strength threshold, or a correspondence between the quantity of resources of feedback information (FIBR x) and the lower signal strength threshold. A larger value of "x" indicates higher quality of service or a higher priority of service, or a larger quantity of resources of feedback information.

Refer to Table 18 and Table 19. Higher quality of service or a higher priority of service indicates a higher requirement on communication reliability, and indicates that more second terminal devices need to send feedback information for reference by the first terminal device. Correspondingly, the range of the annular area needs to be extended. In one embodiment, the range of the annular area may be extended outward. As shown in Table 18 and Table 19, the upper signal strength threshold is reduced from RSRP 5 to RSRP 6, to extend the annular area. Conversely, lower quality of service or a lower priority of service indicates a lower requirement on communication reliability, and indicates the quantity of second terminal devices that can send feedback information may be appropriately reduced, to reduce resource consumption of feedback information. In one embodiment, the range of the annular area may be narrowed inward. As shown in Table 18 and Table 19, the lower signal strength threshold is increased from RSRP 5 to RSRP 4, to narrow the annular area.

TABLE 18

| Quality of service (from low to high) | Lower signal strength threshold |
|---|---|
| QoS 1 | RSRP 4 |
| QoS 2 (QoS 2 > QoS 1) | RSRP 5 (RSRP 5 < RSRP 4) |
| QoS 3 (QoS 3 > QoS 2) | RSRP 6 (RSRP 6 < RSRP 5) |
| ... | ... |

TABLE 19

| Priority of service (from low to high) | Lower signal strength threshold |
|---|---|
| PPPP 1 | RSRP 4 |
| PPPP 2 (PPPP 2 > PPPP 1) | RSRP 5 (RSRP 5 < RSRP 4) |
| PPPP 3 (PPPP 3 > PPPP 2) | RSRP 6 (RSRP 6 < RSRP 5) |
| ... | ... |

TABLE 20

| Resource of feedback information (from less to more) | Lower signal strength threshold |
|---|---|
| FBIR 1 | RSRP 4 |
| FBIR 2 (FBIR 2 > FBIR 1) | RSRP 5 (RSRP 5 < RSRP 4) |
| FBIR 3 (FBIR 3 > FBIR 2) | RSRP 6 (RSRP 6 < RSRP 5) |
| ... | ... |

It can be learned from Table 20 that, a larger quantity of resources of feedback information may allow more second terminal devices to send feedback information for reference by the first terminal device, thereby improving communication reliability. Correspondingly, the range of the annular area may be extended. In one embodiment, the range of the annular area may be extended outward. As shown in Table 20, the lower signal strength threshold is reduced from RSRP 4 to RSRP 5, to extend the annular area. Conversely, a smaller quantity of resources of feedback information indicates that the amount of feedback information needs to be reduced. For example, the quantity of second terminal devices that can send feedback information may be appropriately reduced, to reduce resource consumption of feedback information. In one embodiment, the range of the annular area may be narrowed inward. As shown in Table 20, the lower signal strength threshold is increased from RSRP 6 to RSRP 5, to narrow the annular area.

It should be noted that the quality of service QoS may be represented by using the different technical indicators such as the bit error rate, the delay, and the data rate, and the correspondences between the different technical indicators with the different values and the quality of service may be different. For example, for the bit error rate and the delay, a smaller value indicates higher quality of service QoS; but for the data rate, a larger value indicates higher quality of service.

Similarly, the priority of service may also be expressed in the different forms. For example, a larger value of the priority of service indicates a higher priority, or a smaller value of the priority of service indicates a higher priority. The correspondences between the service priorities expressed in the different forms with the different values and the quality of service may also be different.

In this embodiment of this application, the upper signal strength threshold and/or the lower signal strength threshold may alternatively be determined based on the feedback information. Details are described below. The feedback information may include an acknowledgment ACK or a negative acknowledgment NACK, and/or channel state information CSI.

In another embodiment, the following rule 5 may be used to determine the upper signal strength threshold and the lower signal strength threshold.

Rule 5: The upper signal strength threshold is negatively correlated with a quantity of negative acknowledgments NACKs or an amount of channel state information CSI less than or equal to a first threshold; and/or the lower signal strength threshold is positively correlated with the quantity of negative acknowledgments NACKs or the amount of channel state information CSI less than or equal to the first threshold. The quantity of negative acknowledgments NACKs may be a quantity of timeslots in which negative acknowledgments NACKs are received by the first terminal device within a first specified time period. The first specified time period may generally include a plurality of timeslots, for example, may be a plurality of consecutive timeslots or a time window (time window) including a plurality of consecutive timeslots, for example, 10 ms or 50 ms. This is not limited in this embodiment of this application.

It should be noted that the timeslot in which the negative acknowledgment NACK is received is a timeslot in which the at least one negative acknowledgment NACK is received. That is, as long as the negative acknowledgment NACK is received in the timeslot, the timeslot may be considered as a timeslot in which the negative acknowledgment NACK is received. Only when all HARQ acknowledgments received in a timeslot are acknowledgments ACKs, the timeslot can be considered as a timeslot in which an acknowledgment ACK is received.

For example, Table 21 and Table 22 respectively show a correspondence between the quantity of negative acknowledgments NACKs (NACK x) and the upper signal strength threshold, or a correspondence between the amount of channel state information CSI (CSI x) less than or equal to the first threshold and the upper signal strength threshold. A larger value of "x" indicates a larger quantity.

TABLE 21

| Quantity of NACKs (from less to more) | Upper signal strength threshold |
| --- | --- |
| NACK 1 | RSRP 1 |
| NACK 2 (NACK 2 > NACK 1) | RSRP 2 (RSRP 2 < RSRP 1) |
| NACK 3 (NACK 3 > NACK 2) | RSRP 3 (RSRP 3 < RSRP 2) |
| ... | ... |

TABLE 22

| CSI less than or equal to the first threshold (from less to more) | Upper signal strength threshold |
| --- | --- |
| CSI 1 | RSRP 1 |
| CSI 2 (CSI 2 > CSI 1) | RSRP 2 (RSRP 2 < RSRP 1) |
| CSI 3 (CSI 3 > CSI 2) | RSRP 3 (RSRP 3 < RSRP 2) |
| ... | ... |

Refer to Table 21 and Table 22. A larger quantity of negative acknowledgments NACKs or a larger amount of channel state information CSI less than or equal to the first threshold may indicate the larger quantity of second terminal devices that actually send feedback information, and a larger value of the upper signal strength threshold. However, in actual application, the first terminal device still needs to resend data even if the first terminal device receives only one negative acknowledgment NACK. In other words, only one negative acknowledgment NACK is needed. Therefore, to reduce the amount of feedback information and reduce signaling consumption and resource consumption, the range of the annular area needs to be narrowed. In one embodiment, the range of the annular area may be narrowed outward. As shown in Table 21 and Table 22, the upper signal strength threshold is reduced from RSRP 3 to RSRP 2, to narrow the annular area.

For example, Table 23 and Table 24 respectively show a correspondence between the quantity of negative acknowledgments NACKs (NACK x) and the lower signal strength threshold, or a correspondence between the amount of channel state information CSI (CSI x) less than or equal to the first threshold and the lower signal strength threshold. A larger value of "x" indicates a larger quantity.

Refer to Table 23 and Table 24. A larger quantity of negative acknowledgments NACKs or a larger amount of channel state information CSI less than or equal to the first threshold may indicate the larger quantity of second terminal devices that actually send feedback information, and a smaller value of the lower signal strength threshold. However, in actual application, the first terminal device still needs to resend data even if the first terminal device receives only one negative acknowledgment NACK. In other words, only one negative acknowledgment NACK is needed. Therefore, to reduce the amount of feedback information and reduce signaling consumption and resource consumption, the range of the annular area needs to be narrowed. In one embodiment, the range of the annular area may be narrowed inward. As shown in Table 23 and Table 24, the lower signal strength threshold is increased from RSRP 4 to RSRP 5, to narrow the annular area.

TABLE 23

| Quantity of NACKs (from less to more) | Lower signal strength threshold |
| --- | --- |
| NACK 1 | RSRP 4 |
| NACK 2 (NACK 2 > NACK 1) | RSRP 5 (RSRP 5 > RSRP 4) |
| NACK 3 (NACK 3 > NACK 2) | RSRP 6 (RSRP 6 > RSRP 5) |
| ... | ... |

TABLE 24

| CSI less than or equal to the first threshold (from less to more) | Lower signal strength threshold |
|---|---|
| RSRP 2 | RSRP 4 |
| CSI 2 (CSI 2 > CSI 1) | RSRP 5 (RSRP 5 > RSRP 4) |
| CSI 3 (CSI 3 > CSI 2) | RSRP 6 (RSRP 6 > RSRP 5) |
| ... | ... |

In still another embodiment, the following rule 6 may be used to determine the upper signal strength threshold and the lower signal strength threshold.

Rule 6: The upper signal strength threshold is positively correlated with a quantity of acknowledgments ACKs or an amount of CSI information greater than or equal to a second threshold; and/or the lower signal strength threshold is positively correlated with the quantity of acknowledgments ACKs or the amount of CSI information greater than or equal to the second threshold. In one embodiment, the quantity of acknowledgments ACKs may be a quantity of timeslots in which all HARQ acknowledgments received by the first terminal device within a second specified time period are acknowledgments ACKs. The second specified time period may generally include a plurality of timeslots, for example, may be a plurality of consecutive timeslots or a time window including a plurality of consecutive timeslots, for example, 10 ms or 50 ms. This is not limited in this embodiment of this application. The second threshold is greater than the first threshold.

For example, Table 25 to Table 28 respectively show a correspondence between the quantity of acknowledgments ACKs (ACK x) and the upper signal strength threshold, or a correspondence between the amount of channel state information CSI (CSI x) greater than or equal to the second threshold and the upper signal strength threshold. A larger value of "x" indicates a larger quantity.

Refer to Table 25 and Table 26. A larger quantity of acknowledgments ACKs or a larger amount channel state information CSI greater than or equal to the second threshold indicates that the channel condition of the annular area is better, and the corresponding data transmission quality is better, for example, no bit error occurs. In other words, the setting of the annular area may be inappropriate. For example, the distance between the annular area and the first terminal device is extremely close, and the feedback information sent by the second terminal device in the annular area has no reference value. In addition, another risk may also exist. Refer to FIG. 4. It is assumed that the first terminal device resends data only based on the negative acknowledgment NACK sent by the second terminal device in the annular area or the channel state information CSI less than or equal to the first threshold. In this case, the second terminal device in the outer circle area is not allowed to send feedback information. In addition, when the second terminal device in the outer circle area fails to receive data, the first terminal device does not resend data. As a result, the second terminal device in the outer circle area has no opportunity to receive data again. As a result, reliability of direct communication between the terminal devices is degraded. To resolve the foregoing problem, the annular area may be moved outward as a whole, to be specific, the lower distance threshold and the upper distance threshold are reduced at the same time. As shown in Table 11 and Table 12, the upper distance threshold is reduced from RSRP 2 to RSRP 3; and/or as shown in Table 27 and Table 28, the lower distance threshold is reduced from RSRP 4 to RSRP 5, to improve reliability of direct communication between the terminal devices.

TABLE 25

| Quantity of ACKs (from less to more) | Upper signal strength threshold |
|---|---|
| ACK 1 | RSRP 1 |
| ACK 2 (ACK 2 > ACK 1) | RSRP 2 (RSRP 2 < RSRP 1) |
| ACK 3 (ACK 3 > ACK 2) | RSRP 3 (RSRP 3 < RSRP 2) |
| ... | ... |

TABLE 26

| CSI greater than or equal to the second threshold (from less to more) | Upper signal strength threshold |
|---|---|
| CSI 1 | RSRP 1 |
| CSI 2 (CSI 2 > CSI 1) | RSRP 2 (RSRP 2 < RSRP 1) |
| CSI 3 (CSI 3 > CSI 2) | RSRP 3 (RSRP 3 < RSRP 2) |
| ... | ... |

TABLE 27

| Quantity of ACKs (from less to more) | Lower signal strength threshold |
|---|---|
| ACK 1 | RSRP 4 |
| ACK 2 (ACK 2 > ACK 1) | RSRP 5 (RSRP 5 < RSRP 4) |
| ACK 3 (ACK 3 > ACK 2) | RSRP 6 (RSRP 6 < RSRP 5) |
| ... | ... |

TABLE 28

| CSI greater than or equal to the second threshold (from less to more) | Lower signal strength threshold |
|---|---|
| CSI 1 | RSRP 4 |
| CSI 2 (CSI 2 > CSI 1) | RSRP 5 (RSRP 5 < RSRP 4) |
| CSI 3 (CSI 3 > CSI 2) | RSRP 6 (RSRP 6 < RSRP 5) |
| ... | ... |

S303: The second terminal device sends feedback information to the first terminal device. Correspondingly, the first terminal device receives the feedback information from the at least one second terminal device.

In one embodiment, if the first signal includes data, the feedback information sent by the second terminal device to the first terminal device is HARQ information. If the HARQ information fed back by the second terminal device is NACK information, the first terminal device resends data. If the HARQ information fed back by the second terminal device is not the NACK information, the first terminal device does not resend data. In one embodiment, if the first terminal device receives HARQ information fed back by a plurality of second terminal devices, as long as the at least one second terminal device in the annular area feeds back a NACK, the first terminal device needs to resend data.

In one embodiment, if the first signal includes the control signal, the feedback information sent by the second terminal device to the first terminal device is channel state information CSI. The control signal is used to trigger the aperiodic CSI. The first terminal device determines a modulation and coding scheme (modulation and coding scheme, MCS) of the data based on the CSI.

In one embodiment, if the first signal includes the reference signal, the feedback information sent by the second terminal device to the first terminal device is channel state information CSI. The second terminal obtains the channel state information CSI by measuring the reference signal. The first terminal device determines the MCS of the data based on the CSI.

In one embodiment, if the first terminal device receives CSI fed back by the plurality of second terminal devices, the first terminal device may determine the MCS of the data based on worst CSI.

In one embodiment, there may be a plurality of specified areas; and a feedback policy of any one of the plurality of specified areas may be independently determined, and/or a resource of feedback information of the any one of the plurality of specified areas may be independently determined. The feedback policy may include one or more of the following: sending a negative acknowledgment NACK and skipping sending an acknowledgment ACK indication; or sending an acknowledgment ACK or sending a negative acknowledgment NACK indication; or skipping sending an acknowledgment ACK and skipping sending a negative acknowledgment NACK indication; or sending channel state information CSI less than the first threshold and skipping sending channel state information CSI greater than or equal to the first threshold; or sending channel state information CSI; or skipping sending channel state information CSI. The feedback policy may alternatively use different feedback modes such as a periodic feedback mode, an aperiodic feedback mode, and a semi-persistent feedback mode. Alternatively, the feedback policy may use different feedback formats, for example, use a long feedback channel or a short feedback channel, or use a large-bit feedback channel or a small-bit feedback channel.

The following separately describes the feedback policy in detail by using the inner circle area, the annular area, and the outer circle area in FIG. 4 as an example.

For example, refer to FIG. 4. Given that a distance from the inner circle area to the first terminal device is relatively short and/or a signal in the inner circle area is relatively strong, it may be considered that a success rate for the second terminal in the inner circle area to receive a signal sent by the first terminal is relatively high. Therefore, a probability of feeding back an acknowledgment (acknowledgement, ACK) and/or good channel state information (channel state information, CSI) by the second terminal in the inner circle area is relatively high. The inner circle area has little reference value for adjusting a data sending policy by the first terminal device. Correspondingly, the second terminal device in the inner circle area may be prohibited from feeding back the acknowledgment ACK and the channel state information CSI greater than or equal to the second threshold, in other words, the second terminal device in the inner circle area is only allowed to feed back the negative acknowledgment NACK and the channel state information CSI less than or equal to the first threshold. Therefore, the amount of feedback information sent by the second terminal device in the inner circle area can be effectively reduced, and resource consumption and signaling consumption for transmitting feedback information can be reduced.

For example, refer to FIG. 4. Given that a distance from the outer circle area to the first terminal device is relatively long and/or a signal in the outer circle area is relatively poor, it may be considered that a success rate for the second terminal in the outer circle area to receive the signal sent by the first terminal is relatively low. Therefore, a probability of feeding back a negative acknowledgment (NACK) and/or bad channel state information (CSI) by the second terminal in the outer circle area is relatively high. The outer circle area has little reference value for adjusting the data sending policy by the first terminal device. Correspondingly, the second terminal device in the outer circle area may be prohibited from sending feedback information. Therefore, the amount of feedback information sent by the second terminal device in the outer circle area can be effectively reduced, and resource consumption and signaling consumption for transmitting feedback information can be reduced.

For example, refer to FIG. 4. Different from the inner circle area and the outer circle area, a distance from the annular area to the first terminal device and/or strength of a signal in the annular area are/is between the distance from the inner circle area to the first terminal device and/or strength of the signal in the inner circle area and the distance from the outer circle area to the first terminal device and/or strength of the signal in the outer circle area. A success rate for the second terminal in the annular area to receive the signal sent by the first terminal is also between the success rate for the second terminal in the inner circle area to receive the signal sent by the first terminal and the success rate for the second terminal in the outer circle area to receive the signal sent by the first terminal. In addition, the annular area is more sensitive to a change of a radio channel condition, and has most reference value for adjusting the data sending policy by the first terminal device. Therefore, the second terminal device in the annular area may be allowed to send a plurality of types of feedback information, for example, the acknowledgment ACK or the negative acknowledgment NACK, and channel state information CSI with various values.

The first terminal device and/or the network device may adjust, in real time, one or more of an upper distance threshold, a lower distance threshold, an upper signal strength threshold, and a lower signal strength threshold of the specified area according to rule 1 to rule 6 in S302. Specifically, this may specifically include:

In one embodiment, the communication method may further include the following operation: The first terminal device sends one or more of the upper distance threshold, the lower distance threshold, the upper signal strength threshold, and the lower signal strength threshold of the specified area to the at least one second terminal device. Correspondingly, the second terminal device receives the one or more of the upper distance threshold, the lower distance threshold, the upper signal strength threshold, and the lower signal strength threshold of the specified area sent by the first terminal device. The first terminal device may send the one or more of the upper distance threshold, the lower distance threshold, the upper signal strength threshold, and the lower signal strength threshold by using the radio resource control signaling, the media access control signaling, the master information block, the system information block, or the physical control information.

In another embodiment, the communication method may further include the following operation: The first terminal device reports the one or more of the upper distance threshold, the lower distance threshold, the upper signal strength threshold, and the lower signal strength threshold of the specified area to the network device. Then, the network device broadcasts the foregoing thresholds. Correspondingly, the second terminal device may receive the one or more of the upper distance threshold, the lower distance threshold, the upper signal strength threshold, and the lower signal strength threshold of the specified area sent by the network device.

In still another embodiment, the communication method may further include the following operation: The first terminal device reports a statistical result of the feedback information received by the first terminal device from the at least one second terminal device to the network device. Then, the network device determines the one or more of the upper distance threshold, the lower distance threshold, the upper signal strength threshold, and the lower signal strength threshold of the specified area based on the statistical result of the feedback information, and broadcasts the foregoing various thresholds. Correspondingly, the first terminal device and the second terminal device may receive the one or more of the upper distance threshold, the lower distance threshold, the upper signal strength threshold, and the lower signal strength threshold of the specified area sent by the network device.

The first terminal device receives the feedback information, and the first terminal device may further adjust the data sending policy based on the feedback information, for example, adjust transmit power or a resource. Therefore, In one embodiment, the communication method may further include the following operation: The first terminal device adjusts the data sending policy based on the feedback information.

In one embodiment, that the first terminal device adjusts the data sending policy based on the feedback information may include the following operation: If the feedback information includes the negative acknowledgment NACK, the first terminal device resends data. Alternatively, if the first terminal device does not receive any feedback information within the second specified time period, the first terminal device resends data.

In one embodiment, that the first terminal device adjusts the data sending policy based on the feedback information may include the following operation: The first terminal device adjusts a new data sending policy based on the feedback information, for example, increasing or decreasing transmit power; increasing, decreasing, or changing a data sending resource; increasing/decreasing a bit rate; or the like.

It should be noted that, in the foregoing method embodiment, an example in which the first terminal device is a sender and the at least one second terminal device is a receiver is used for description. In actual application, roles of the sender and the receiver may be dynamically changed. In addition, the first terminal device may separately directly communicate with the at least two second terminal devices such as the second terminal device A, the second terminal device B, and the second terminal device C in FIG. 4 and FIG. 5, but roles of the first terminal device may be different for different second terminal devices. For example, for the second terminal device A and the second terminal device B, the first terminal device is a sender, but for the second terminal device C, the first terminal device is a receiver. A sending/receiving role of a terminal device in communication between different terminal devices is not limited in this embodiment of this application.

According to the communication method provided in this application, after sending the first signal, the first terminal device receives only the feedback information sent by the second terminal device in the specified area determined based on the upper distance threshold and the lower distance threshold or the upper signal strength threshold and the lower signal strength threshold, for example, an annular area, and does not receive feedback information sent by a terminal device that communicates with the first terminal device outside the specified area. This can resolve a problem that feedback information sent by a terminal device that is extremely close to the first terminal device has no reference value but occupies a large quantity of resources of feedback information. Therefore, the amount of feedback information and the quantity of resources of feedback information occupied by the feedback information are reduced, and resource utilization and communication efficiency can be improved.

Figure 6:
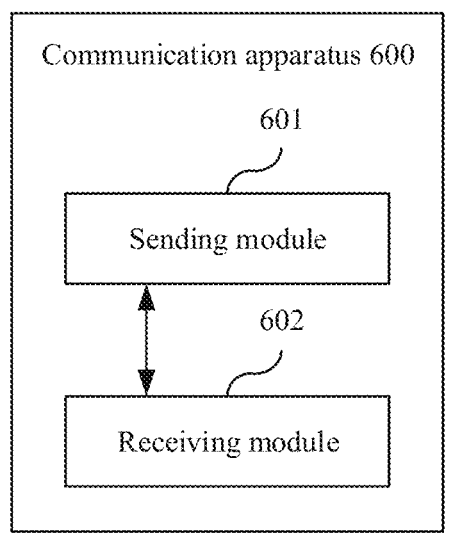
FIG. 6 is a schematic diagram 2 of a structure of a communication apparatus according to an embodiment of this application.
Figure 7:
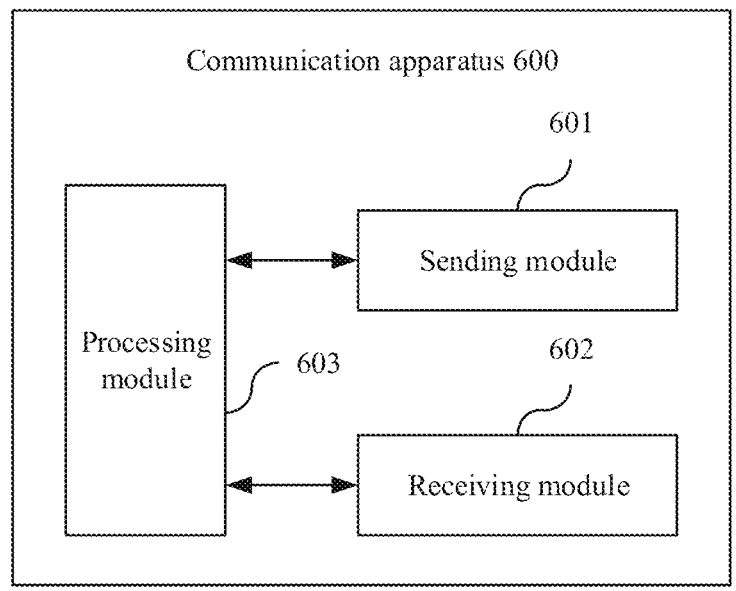
FIG. 7 is a schematic diagram 3 of a structure of a communication apparatus according to an embodiment of this application.
Figure 8:
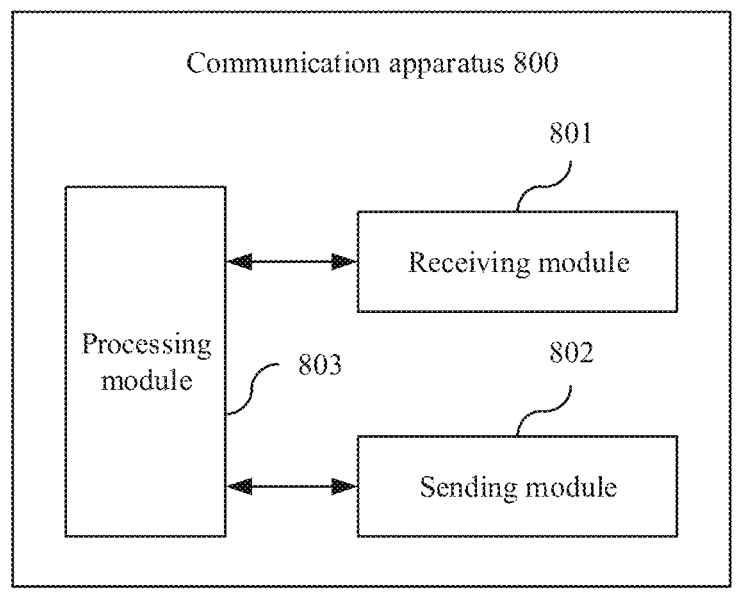
FIG. 8 is a schematic diagram 4 of a structure of a communication apparatus according to an embodiment of this application.

The foregoing describes in detail the communication method in the embodiments of this application with reference to FIG. 3 to FIG. 5 and Table 1 to Table 28. With reference to FIG. 6 to FIG. 8, the following describes in detail a communication apparatus that can perform the communication method in the method embodiments of this application.

FIG. 6 is a schematic diagram of a structure of another communication apparatus according to an embodiment of this application. The communication apparatus is configured to perform functions performed by the first terminal device in the foregoing method embodiments. As shown in FIG. 6, the communication apparatus 600 includes a sending module 601 and a receiving module 602.

The sending module 601 is configured to send a first signal.

In one embodiment, the sending module 601 is further configured to send location information of the communication apparatus 600, so that another terminal device, for example, a second terminal device, determines a distance between the another terminal device and the communication apparatus 600 based on the location information of the communication apparatus 600. For content, a determining method, and a sending manner of the location information, refer to the foregoing method embodiments. Details are not described herein again.

The receiving module 602 is configured to receive feedback information from at least one second terminal device in a specified area. The specified area is an area to which a distance from the first terminal device is greater than or equal to a lower distance threshold and/or less than or equal to an upper distance threshold; or the specified area is an area in which strength of a signal received from the first terminal device is greater than or equal to a lower signal strength threshold and/or less than or equal to an upper signal strength threshold.

In one embodiment, the upper distance threshold is positively correlated with quality of service QoS, a priority of service, or a quantity of resources of feedback information; and/or the lower distance threshold is negatively correlated with the quality of service QoS, the priority of service, or the quantity of resources of feedback information.

In one embodiment, the feedback information may include a negative acknowledgment NACK and/or channel state information CSI. Correspondingly, the upper distance threshold is negatively correlated with a quantity of negative acknowledgments NACKs, an amount of channel state information CSI less than or equal to a first threshold, or a quantity of timeslots in which negative acknowledgments NACKs are received within a first specified time period; and/or the lower distance threshold is positively correlated with the quantity of negative acknowledgments NACKs, the amount of channel state information CSI less than or equal to the first threshold, or the quantity of timeslots in which the negative acknowledgments NACKs are received within the first specified time period.

In one embodiment, the feedback information may include an acknowledgment ACK and/or channel state information CSI. Correspondingly, the upper distance threshold is positively correlated with a quantity of acknowledgments ACKs or an amount of CSI information greater than or equal to a second threshold; and/or the lower distance threshold is positively correlated with the quantity of acknowledgments ACKs or the amount of CSI information greater than or equal to the second threshold.

In one embodiment, the upper signal strength threshold is positively correlated with quality of service QoS, a priority of service, or a quantity of resources of feedback information; and/or the lower signal strength threshold is negatively correlated with the quality of service QoS, the priority of service, or the quantity of resources of feedback information.

In one embodiment, the feedback information may include a negative acknowledgment NACK and/or channel state information CSI. Correspondingly, the upper signal strength threshold is negatively correlated with a quantity of negative acknowledgments NACKs, an amount of channel state information CSI less than or equal to a first threshold, or a quantity of timeslots in which negative acknowledgments NACKs are received within a first specified time period; and/or the lower signal strength threshold is positively correlated with the quantity of negative acknowledgments NACKs, the amount of channel state information CSI less than or equal to the first threshold, or the quantity of timeslots in which the negative acknowledgments NACKs are received within the first specified time period.

Further, when the first specified time period is one timeslot, the quantity of negative acknowledgments NACKs may be the quantity of timeslots in which the negative acknowledgments NACKs are received by the first terminal device within the first specified time period. Alternatively, when the first specified time period is a plurality of timeslots, the quantity of negative acknowledgments NACKs may be the quantity of timeslots in which the negative acknowledgments NACKs are received by the first terminal device within the first specified time period. The plurality of timeslots may be a plurality of consecutive timeslots, or a time window (time window) including a plurality of consecutive timeslots, for example, 10 ms or 50 ms. This is not limited in this embodiment of this application.

In one embodiment, the feedback information may include an acknowledgment ACK and/or channel state information CSI. Correspondingly, the upper signal strength threshold is negatively correlated with a quantity of acknowledgments ACKs or an amount of CSI information greater than or equal to a second threshold; and/or the lower signal strength threshold is negatively correlated with the quantity of acknowledgments ACKs or the amount of CSI information greater than or equal to the second threshold.

In one embodiment, there may be a plurality of specified areas; and a feedback policy of any one of the plurality of specified areas may be independently determined, and/or a resource of feedback information of the any one of the plurality of specified areas may be independently determined. The feedback policy may include: sending a negative acknowledgment NACK and skipping sending an acknowledgment ACK indication; or sending an acknowledgment ACK or sending a negative acknowledgment NACK indication; or skipping sending an acknowledgment ACK and skipping sending a negative acknowledgment NACK indication; or sending channel state information CSI less than the first threshold and skipping sending channel state information CSI greater than or equal to the first threshold; or sending channel state information CSI; or skipping sending channel state information CSI.

In one embodiment, the sending module 601 is further configured to send one or more of an upper distance threshold, a lower distance threshold, an upper signal strength threshold, and a lower signal strength threshold of the specified area.

In one embodiment, as shown in FIG. 7, the communication apparatus 600 may further include a processing module 603. The processing module 603 is configured to adjust a data sending policy based on the feedback information.

In one embodiment, the processing module 603 is further configured to: if the feedback information includes the negative acknowledgment NACK, control the sending module 601 to resend data. Alternatively, In one embodiment, the processing module 603 is further configured to: if the receiving module 602 does not receive any feedback information within a second specified time period, control the sending module 601 to resend data.

It should be noted that the communication apparatus 600 may be a terminal device, or may be a chip or a chip system disposed in a terminal device. This is not limited in this application.

In one embodiment, the communication apparatus 600 may further include a storage module (not shown in FIG. 6 and FIG. 7). The storage module is configured to store instructions, and the processing module 603 is configured to execute the instructions stored in the storage module, so that the processing module 603 performs the communication method in the foregoing method embodiments.

FIG. 8 is a schematic diagram of a structure of still another communication apparatus according to an embodiment of this application. The communication apparatus is configured to perform functions performed by the second terminal device in the foregoing method embodiments. As shown in FIG. 8, the communication apparatus 800 includes a receiving module 801, a sending module 802, and a processing module 803.

The receiving module 801 is configured to receive a first signal from a first terminal device.

In one embodiment, the receiving module 801 is configured to receive location information of the first terminal device. Correspondingly, the processing module 803 is further configured to determine a distance between the first terminal device and the communication apparatus 800 based on location information of the communication apparatus 800 and the location information of the first terminal device. For content, a receiving manner, and a distance determining method of the location information, refer to the foregoing method embodiments. Details are not described herein again.

The processing module 803 is configured to determine that the communication apparatus is located in a specified area. The specified area is an area to which a distance from the first terminal device is greater than or equal to a lower distance threshold and/or less than or equal to an upper distance threshold; or the specified area is an area in which strength of a signal received from the first terminal device is greater than or equal to a lower signal strength threshold and/or less than or equal to an upper signal strength threshold.

The sending module 802 is configured to send feedback information to the first terminal device.

In one embodiment, the upper distance threshold is positively correlated with quality of service QoS, a priority of service, or a quantity of resources of feedback information; and/or the lower distance threshold is negatively correlated with the quality of service QoS, the priority of service, or the quantity of resources of feedback information.

In one embodiment, the upper signal strength threshold is positively correlated with quality of service QoS, a priority of service, or a quantity of resources of feedback information; and/or the lower signal strength threshold is negatively correlated with the quality of service QoS, the priority of service, or the quantity of resources of feedback information.

In one embodiment, there may be a plurality of specified areas; and a feedback policy of any one of the plurality of specified areas may be independently determined, and/or a resource of feedback information of the any one of the plurality of specified areas may be independently determined. The feedback policy may include: sending a negative acknowledgment NACK and skipping sending an acknowledgment ACK indication; or sending an acknowledgment ACK or sending a negative acknowledgment NACK indication; or skipping sending an acknowledgment ACK and skipping sending a negative acknowledgment NACK indication; or sending channel state information CSI less than the first threshold and skipping sending channel state information CSI greater than or equal to the first threshold; or sending channel state information CSI; or skipping sending channel state information CSI.

In one embodiment, the receiving module 801 is further configured to receive one or more of an upper distance threshold, a lower distance threshold, an upper signal strength threshold, and a lower signal strength threshold of the specified area from the first terminal device or a base station.

The communication apparatus 800 may be a terminal device, or may be a chip or a chip system disposed in a terminal device. This is not limited in this application.

In one embodiment, the communication apparatus 800 may further include a storage module (not shown in FIG. 8). The storage module is configured to store instructions, and the processing module 803 is configured to execute the instructions stored in the storage module, so that the processing module 803 performs the communication method or the distance determining method in the foregoing method embodiments.

An embodiment of this application provides a computer program product. The computer program product includes computer program code. When the computer program code is run on a computer, the computer is enabled to perform the communication method or the distance determining method in the foregoing method embodiments.

An embodiment of this application provides a readable storage medium. The readable storage medium stores a program or instructions. When the program or the instructions is/are run on a computer, the computer is enabled to perform the communication method or the distance determining method in the foregoing method embodiments.

It should be understood that, the processor in the embodiments of this application may be a central processing unit (CPU), or may be another general-purpose processor, a digital signal processor (DSP), an application-specific integrated circuit (ASIC), a field-programmable gate array (FPGA), or another programmable logic device, a discrete gate or a transistor logic device, a discrete hardware component, or the like. The general-purpose processor may be a microprocessor, or the processor may be any conventional processor or the like.

It should be further understood that the memory in the embodiments of this application may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. For example but not limitation, many forms of random access memories (RAM) may be used such as a static random access memory (SRAM), a dynamic random access memory (DRAM), a synchronous dynamic random access memory (SDRAM), a double data rate synchronous dynamic random access memory (double data rate SDRAM (DDR SDRAM)), an enhanced synchronous dynamic random access memory (enhanced SDRAM (ESDRAM)), a synchlink dynamic random access memory (synchlink DRAM (SLDRAM)), and a direct rambus random access memory (direct rambus RAM (DR RAM)).

All or some of the foregoing embodiments may be implemented by software, hardware (for example, a circuit), firmware, or any combination thereof. When the software is used to implement the embodiments, all or some of the foregoing embodiments may be implemented in a form of a computer program product. The computer program product includes one or more computer instructions or computer programs. When the computer instructions or the computer programs are loaded or executed on a computer, all or some of the procedures or functions according to the embodiments of this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in the embodiments of this application describes only an association relationship for describing associated objects and represents that three relationships may exist. For example, A and/or B may represent the following three cases: Only A exists, both A and B exist, and only B exists. A and B may be singular or plural. In addition, the character "/" in this specification usually represents an "or" relationship between the associated objects, or may represent an "and/or" relationship. For details, refer to foregoing and following description for understanding.

In this embodiment of this application, "at least one" means one or more, and "a plurality of" means two or at least two. "At least one of the following items (pieces)" or a similar expression thereof means any combination of these items, including any combination of singular items (pieces) or plural items (pieces). For example, at least one item (piece) of a, b, or c may represent: a, b, c, a and b, a and c, b and c, or a, b, and c, where a, b, and c may be singular or plural.

In the embodiments of this application, the terms "first", "second", and the like are intended to distinguish between different objects or distinguish between different processing of a same object, but do not indicate a particular order of the objects.

In the embodiments of this application, the terms "include", "have", and any other variant thereof are intended to cover a non-exclusive inclusion. For example, a process, a method, a system, a product, or a device that includes a series of operations or units is not limited to the listed operations or units, but In one embodiment further includes other unlisted operations or units, or further includes another inherent operation or unit of the process, the method, the product, or the device.

In the embodiments of this application, the word "example" or "for example" is used to represent giving an example, an illustration, or description. Any embodiment or design scheme described as an "example" or "for example" in the embodiments of this application should not be explained as being more preferred or having more advantages than another embodiment or design scheme. Specifically, use of "example" or "for example" is intended to present a relative concept in a specific manner.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that, in combination with the examples described in the embodiments disclosed in this specification, units and algorithm operations can be implemented by electronic hardware or a combination of computer software and electronic hardware. Whether the functions are performed by the hardware or the software depends on particular applications and design constraints of the technical solutions. A person skilled in the art may use different methods to implement the described functions for each particular application, but it should not be considered that the implementation goes beyond the scope of this application.

It may be clearly understood by the person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

Units described as separate parts may or may not be physically separate, and parts displayed as units may or may not be physical units, may be located in one position, or may be distributed on a plurality of network units. Some or all of the units may be selected based on an actual requirement to achieve an objective of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the operations of the methods described in the embodiments of this application. The foregoing storage medium includes: any medium, for example, a USB flash drive, a removable hard disk, a read-only memory (ROM), a random access memory (RAM), a magnetic disk, or an optical disc, that can store program code.

The foregoing description is merely a specific implementation of this application, but is not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method applied to a first terminal device, the communication method comprising:
   sending, by the first terminal device, a first signal; and
   receiving, by the first terminal device, feedback information from at least one second terminal device in a specified area determined based on at least one of an upper distance threshold, a lower distance threshold, an upper signal strength threshold, or a lower signal strength threshold, wherein the specified area is an area to which a distance from the first terminal device is greater than or equal to the lower distance threshold and/or less than or equal to the upper distance threshold; or the specified area is an area in which a strength of a signal received from the first terminal device is greater than or equal to the lower signal strength threshold and/or less than or equal to the upper signal strength threshold, wherein the upper distance threshold is positively correlated with a priority of service, and wherein the lower distance threshold is negatively correlated with the priority of service.

2. The communication method according to claim 1, wherein the upper distance threshold is positively correlated with a quality of service, or a quantity of resources of feedback information; and wherein the lower distance threshold is negatively correlated with the quality of service, the priority of service, or the quantity of resources of feedback information.

3. The communication method according to claim 1, wherein the feedback information comprises at least one of a negative acknowledgment (NACK) or channel state information (CSI); and wherein the upper distance threshold is negatively correlated with a quantity of NACKs or an amount of CSI less than or equal to a first threshold, and/or the lower distance threshold is positively correlated with the quantity of NACKs or the amount of CSI less than or equal to the first threshold.

4. The communication method according to claim 1, wherein the feedback information comprises at least one of an acknowledgment (ACK) or CSI; and wherein the upper distance threshold is positively correlated with a quantity of ACKs or an amount of CSI greater than or equal to a second threshold, and/or the lower distance threshold is positively correlated with the quantity of the ACKs or the amount of CSI greater than or equal to the second threshold.

5. The communication method according to claim 1, wherein the upper signal strength threshold is positively correlated with a quality of service, a priority of service, or a quantity of resources of feedback information; and/or the lower signal strength threshold is negatively correlated with the quality of service, the priority of service, or the quantity of resources of feedback information.

6. The communication method according to claim 1, wherein the communication method further comprises:
sending, by the first terminal device, one or more of the upper distance threshold, the lower distance threshold, the upper signal strength threshold, or the lower signal strength threshold of the specified area.

7. A communication method applied to a second terminal device, the communication method comprising:
receiving, by the second terminal device, a first signal from a first terminal device;
determining, by the second terminal device, that the second terminal device is located in a specified area based on at least one of an upper distance threshold, a lower distance threshold, an upper signal strength threshold, or a lower signal strength threshold, wherein the specified area is an area to which a distance from the first terminal device is greater than or equal to the lower distance threshold and/or less than or equal to the upper distance threshold; or the specified area is an area in which a strength of a signal received from the first terminal device is greater than or equal to the lower signal strength threshold and/or less than or equal to the upper signal strength threshold, wherein the upper distance threshold is positively correlated with a priority of service, and wherein the lower distance threshold is negatively correlated with the priority of service; and
sending, by the second terminal device, feedback information to the first terminal device.

8. The communication method according to claim 7, wherein the upper distance threshold is positively correlated with a quality of service, or a quantity of resources of feedback information; and wherein the lower distance threshold is negatively correlated with the quality of service, or the quantity of resources of feedback information.

9. The communication method according to claim 7, wherein the upper signal strength threshold is positively correlated with a quality of service, a priority of service, or a quantity of resources of feedback information; and wherein the lower signal strength threshold is negatively correlated with the quality of service, the priority of service, or the quantity of resources of feedback information.

10. The communication method according to claim 7, wherein the communication method further comprises:
receiving, by the second terminal device, one or more of the upper distance threshold, the lower distance threshold, the upper signal strength threshold, or the lower signal strength threshold of the specified area from the first terminal device or a base station.

11. A communication apparatus, comprising:
a memory storage comprising instructions; and
one or more processors in communication with the memory storage, wherein an execution of the instructions by the one or more processors causes the apparatus to:
send a first signal; and
receive feedback information from at least one second terminal device in a specified area determined based on at least one of an upper distance threshold, a lower distance threshold, an upper signal strength threshold, or a lower signal strength threshold, wherein the specified area is an area to which a distance from an first terminal device is greater than or equal to the lower distance threshold and/or less than or equal to the upper distance threshold; or the specified area is an area in which a strength of a signal received from the first terminal device is greater than or equal to the lower signal strength threshold and/or less than or equal to the upper signal strength threshold, wherein the upper distance threshold is positively correlated with a priority of service, and wherein the lower distance threshold is negatively correlated with the priority of service.

12. The communication apparatus according to claim 11, wherein the upper distance threshold is positively correlated with a quality of service, or a quantity of resources of feedback information; and wherein the lower distance threshold is negatively correlated with the quality of service, or the quantity of resources of feedback information.

13. The communication apparatus according to claim 11, wherein the feedback information comprises at least one of a negative acknowledgment (NACK) or channel state information (CSI); wherein the upper distance threshold is negatively correlated with a quantity of NACKs or an amount of CSI less than or equal to a first threshold, and wherein the lower distance threshold is positively correlated with the quantity of NACKs or the amount of CSI less than or equal to the first threshold.

14. The communication apparatus according to claim 11, wherein the feedback information comprises at least one of an acknowledgment (ACK) or channel state information (CSI); wherein the upper distance threshold is positively correlated with a quantity of ACKs or an amount of CSI greater than or equal to a second threshold, and wherein the lower distance threshold is positively correlated with the quantity of the ACKs or the amount of CSI greater than or equal to the second threshold.

15. The communication apparatus according to claim 11, wherein the upper signal strength threshold is positively correlated with a quality of service, a priority of service, or a quantity of resources of feedback information; and wherein the lower signal strength threshold is negatively correlated with the quality of service, the priority of service, or the quantity of resources of feedback information.

16. The communication apparatus according to claim 11, wherein
the execution of the instructions by the one or more processors further causes the apparatus to send one or more of the upper distance threshold, the lower distance threshold, the upper signal strength threshold, or the lower signal strength threshold of the specified area.

17. A communication apparatus, comprising:
a memory storage comprising instructions; and
one or more processors in communication with the memory storage, wherein an execution of the instructions by the one or more processors causes the apparatus to:
receive a first signal from a first terminal device;
determine that the communication apparatus is located in a specified area based on at least one of an upper distance threshold, a lower distance threshold, an upper signal strength threshold, or a lower signal strength threshold, wherein the specified area is an area to which a distance from the first terminal device is greater than or equal to the lower distance threshold and/or less than or equal to the upper distance threshold; or the specified area is an area in which a strength of a signal received from the first terminal device is greater than or equal to the lower signal strength threshold and/or less than or equal to the upper signal strength threshold, wherein the upper distance threshold is positively correlated with a priority of service, and wherein the lower distance threshold is negatively correlated with the priority of service; and
send feedback information to the first terminal device.

18. The communication apparatus according to claim 17, wherein the upper distance threshold is positively correlated with a quality of service, or a quantity of resources of feedback information; and wherein the lower distance threshold is negatively correlated with the quality of service, or the quantity of resources of feedback information.

19. The communication apparatus according to claim 17, wherein the upper signal strength threshold is positively correlated with a quality of service, a priority of service, or a quantity of resources of feedback information; and wherein the lower signal strength threshold is negatively correlated with the quality of service, the priority of service, or the quantity of resources of feedback information.

20. The communication apparatus according to claim 17, wherein
the execution of the instructions by the one or more processors further causes the apparatus to receive one or more of the upper distance threshold, the lower distance threshold, the upper signal strength threshold, or the lower signal strength threshold of the specified area from the first terminal device or a base station.

* * * * *